United States Patent [19]

Yamamoto et al.

[11] Patent Number: 5,359,891
[45] Date of Patent: Nov. 1, 1994

[54] THERMAL TYPE FLOWMETER

[75] Inventors: Noboru Yamamoto, Kariya; Yasushi Sugiura, Handa, both of Japan

[73] Assignee: Nippondenso Co., Ltd., Kariya, Japan

[21] Appl. No.: 910,449

[22] Filed: Jul. 8, 1992

[30] Foreign Application Priority Data

| | | |
|---|---|---|
| Jul. 8, 1991 [JP] | Japan | 3-167048 |
| Jul. 8, 1991 [JP] | Japan | 3-167054 |
| Jul. 8, 1991 [JP] | Japan | 3-167064 |
| Jul. 9, 1991 [JP] | Japan | 3-168191 |
| Jul. 10, 1991 [JP] | Japan | 3-170162 |

[51] Int. Cl.$^5$ .............................................. G01F 1/68
[52] U.S. Cl. .................................................. 73/204.15
[58] Field of Search ............. 73/118.2, 204.15, 204.18, 73/204.19

[56] References Cited

U.S. PATENT DOCUMENTS

| | | | |
|---|---|---|---|
| 4,474,058 | 10/1984 | Drews et al. | 73/204.15 X |
| 5,156,046 | 10/1992 | Tanimoto et al. | 73/118.2 X |

FOREIGN PATENT DOCUMENTS

| | | |
|---|---|---|
| 58-87419 | 5/1983 | Japan . |
| 60-163316 | 10/1985 | Japan . |
| 61-16026 | 4/1986 | Japan . |
| 63-43688 | 9/1988 | Japan . |
| 235315 | 2/1990 | Japan . |

*Primary Examiner*—Herbert Goldstein
*Attorney, Agent, or Firm*—Cushman, Darby & Cushman

[57] ABSTRACT

A thermal type flowmeter for measuring a flow rate of a fluid which is equipped with a thermo-sensitive resistor provided within a fluid passage and arranged to heat while being energized. The flowmeter includes an electric power adjusting element provided in series with the thermo-sensitive resistor for adjusting the amount of electric power to be supplied to the thermo-sensitive resistor based on a current inputted to its input terminal. It also includes a constant current source circuit connected to said input terminal of the electric power adjusting element for supplying a predetermined constant current to the input terminal of the electric power adjusting element. A control circuit outputs an adjustment signal to adjust an amount of electric power supplied to the thermo-sensitive resistor so that the thermo-sensitive resistor has a predetermined temperature. A current adjusting circuit connected to the input terminal of the electric power adjusting element divides the constant current from the constant current source circuit in accordance with the adjustment signal from the control circuit so as to adjust the input current to the electric power adjusting element. This arrangement can reduce the minimum operating voltage for the flowmeter because the input current of the electric power adjusting element can be obtained from the constant current source circuit.

19 Claims, 9 Drawing Sheets

THERMAL TYPE FLOWMETER

BACKGROUND OF THE INVENTION

The present invention relates to a thermal type flowmeter which is useful particularly, but not exclusively, for measuring the amount of air input to an internal combustion engine.

The Japanese Patent Provisional Publication No. 55-43447 discloses a conventional thermal type flowmeter in which a thermo-sensitive resistor (temperature sensing device) is provided within a fluid passage so that the flow rate in the fluid passage is measured based on the amount of energy supplied (electricity supply amount) to the thermo-sensitive resistor. The heating value of the thermo-sensitive resistor is then adjusted to cause the temperature of the thermo-sensitive resistor to become constant. Here, an operational amplifier is generally used for the adjustment of the amount of energy supplied to the thermo-sensitive resistor.

FIGS. 11 and 12 show a typical circuit arrangement of a conventional thermal type flowmeter. In FIG. 11, two thermo-sensitive resistors 51 and 52 together with resistors 53 to 55 constitute a bridge circuit where resistors 51 and 52 are to be provided in a flow passage. A current is supplied to the bridge circuit through transistors 56 and 57 darlington-coupled to each other. The voltages due to voltage dividing circuits of the bridge circuit are inputted to an operation amplifier 58, the output of which is inputted through a resistor 59 to the base of the transistor 57. Further, the voltage due to one of the voltage dividing circuits is inputted to an output circuit 60 which includes an amplifier, the output circuit 60 outputting a signal corresponding to the flow rate of the fluid based on that input. Moreover, an operating electric power is supplied from a battery 1 through a resistor 61 to both the operational amplifier 58 and the output circuit 60. Generally, a circuit as shown in FIG. 12 is provided for the outputting portion of the operational amplifier 60. In FIG. 12, the output of the operational amplifier 60 is derived through transistors 62, 63 which are provided at the positive side and darlington-coupled to each other. A transistor 64 is provided at the negative side. The bases of transistors 62 and 63 are coupled to the collector of the transistor 65 which is in turn coupled through a constant current source 67 to a power supply.

In such a conventional circuit, the minimum operating voltage $V_{(MIN)}$ necessary for supplying a current to the bridge circuit to measure the fluid flow rate becomes the sum of the voltage drops $V_{BR}$, $V_{BE1}$, $V_{BE2}$, $V_2$, $V_{BE3}$, $V_{BE4}$, $V_1$ AND $V_{CE(MIN)}$ illustrated in FIGS. 11 and 12. Here, $V_{CE(MIN)}$ represents the minimum value of the voltage-drop voltage of the constant current source necessary for the constant current source which supplies the base current required to normally operate the transistors 62 and 63.

Although such a circuit is capable of measuring the flow rate in the fluid passage, it is not for measurement of systems having low supply voltages because the minimum operating voltage is relatively high. In addition, if using such a conventional circuit for a motor vehicle, difficulty is encountered when measuring the flow rate at the time of start of the internal combustion engine and when the battery voltage is lowered due to unsatisfactory charging to the battery. Particularly, because of these conditions, when a thermal type flowmeter is used for the measurement of the intake air quantity to the internal combustion engine, and the measured flow rate is used for the control of the fuel injection quantity to the engine, normal control of the fuel injection quantity to the engine becomes difficult.

Japanese Utility Model Provisional Publication No. 60-163316 and Japanese Patent Provisional Publication No. 55-43447 also disclose thermal type flowmeters. However, in the flowmeter circuit disclosed in the Japanese Utility Model Provisional Publication No. 60-163316, a transistor is provided in series with a bridge circuit including a thermo-sensitive resistor and voltage amplifying circuit. Hence, the voltage applied to the bridge circuit varies in accordance with the variation of the voltage of the power supply, whereby the signal voltage indicative of the flow rate also varies. Similarly, in the circuit disclosed in the Japanese Utility Model Provisional Publication 60-163316, an offset voltage obtained by dividing the supply voltage by a resistor is given to one input terminal of an operational amplifier. Thus, when voltage is supplied, it is applied virtually directly to a bridge circuit including a thermo-sensitive resistor, whereby there is the possibility that the thermo-sensitive resistor is damaged when the supply voltage is higher than a specified voltage. For example, in the case of using the flowmeter for the measurement of the intake air quantity to an internal combustion engine, an excessive voltage can be applied to the thermo-sensitive resistor during a jumper start (for example, a voltage of 24 V is given to a 12 V-motor vehicle to increase the rotation of the starter motor at the vehicle start time) which is often effected in cold districts.

Still further, the Japanese Patent Publication No. 63-43688 discloses a thermal type flowmeter where a voltage obtained by dividing the supply voltage by a resistor is applied through a diode to a differential amplifier to start a feedback control circuit. Additionally, Japanese Patent Provisional Publication No. 58-87419 discloses a thermal type flowmeter where a current is compulsorily bypassed with respect to the output of an operational amplifier of a heating-coil heating feedback circuit so as to start the control apparatus. However, both the prior art techniques require a terminal for inputting the start signal. Thus, noises may be similarly introduced into an input terminal of an operational amplifier, constituting a feedback circuit, at the normal operation time after the completion of start because a signal is given to the input terminal of the operational amplifier at the start time. Such noise may make it difficult to obtain an output indicative of an accurate flow rate.

In addition, the Japanese Patent Provisional Publication No. 55-43447 discloses a thermal type flowmeter which allows a stable flow rate measurement through two operational amplifiers: one is for controlling the energization amount to a heating thermo-sensitive resistor and the other is for controlling the amount of energy supplied to a temperature-compensating thermo-sensitive resistor. However, since this flowmeter circuit is arranged such that the current to the temperature-compensating thermo-sensitive resistor is supplied from the operational amplifier, the current flowing through the power circuit for the operational amplifier becomes problematically large. That is, when the current flowing through the power circuit becomes large, the voltage drop within the power circuit become great. Hence, the minimum operating voltage of the circuit operated through the power circuit becomes high, thereby making it difficult to measure the flow rate of the fluid when the supply voltage is low. Moreover, when the current flowing through the power circuit becomes large, a power circuit having a large capacity is required to allow the supply of a relatively large current, thus increasing the size of the circuit and cost thereof. In addition, for providing a small-sized and high-quality apparatus at a low cost, it is effective that the circuit is constructed with a monolithic IC. However, the power circuit having a large capacity to allow supply of a relatively large current requires a large area, thereby resulting in the increase in the size and cost of the IC chip.

Moreover, the Japanese Patent Provisional Publication No. 2-35315 discloses a thermal type flowmeter which is arranged to stably measure the flow rate with two differential amplifiers: one is for controlling the energization amount to a heating thermo-sensitive resistor and the other is for controlling the energization amount to a temperature-compensating thermo-sensitive resistor.

Further, this Japanese Patent Provisional Publication No. 2-35315 discloses a technique whereby a resistance bridge circuit including a thermo-sensitive resistor is constructed as a balancing bridge circuit. The connection to an operational amplifier is changed so that the effects of the internal offset voltage of the differential amplifier is reduced. According to this technique, when the internal offset voltages of the differential amplifier are set to $V_{OS1}$ and $V_{OS2}$, the total offset voltage for the entire circuit can be smaller than the sum of $V_{OS1}$ and $V_{OS2}$. As a result of reducing the total offset voltage, it is possible to improve the responsibility of the feedback control circuit. Although it is effective to reduce the total offset voltage of the feedback control circuit when trying to improve the response of the circuit, a positive offset voltage is required for stably operating the circuit. Thus, an offset voltage is positively given to one of the two differential amplifiers such as disclosed in the Japanese Patent Provisional Publication No. 3-15722. As described above, various attempts are taken in order to set the offset voltage to an appropriate value. However, variation in the internal offset voltage of the differential amplifier is inevitable and the internal offset voltage varies between differential amplifiers and further generally has a temperature drift of about $\mu V/°$ C. to 10 10 $\mu V/°$ C. Accordingly, the total offset voltage including the internal offset voltage of the differential amplifier varies in accordance with the internal offset voltage of the differential amplifier. Hence, difficulties arise from circuits constructed using a differential amplifier which have an offset voltage set to a designed value. In addition, although it is considered that the offset voltage is measured after the construction of the circuit, and that the resistance value and the positively given offset voltage are adjusted so that a desired total offset voltage can be obtained, there is a problem that the adjustment increases the cost.

SUMMARY OF THE INVENTION

It is therefore an object of the present invention to provide an improved thermal type flowmeter which is capable of measuring the flow rate at a low operating voltage.

Another object of this invention is to provide a thermal type flowmeter which is capable of stably measuring the flow rate irrespective of variation of the supply voltage, and which is capable of limiting the voltage applied to the thermo-sensitive resistor to a predetermined safety range to protect the thermo-sensitive resistor from an excessive voltage.

A further object of this invention is to provide a thermal type flowmeter which is capable of starting a feedback control circuit with a simple circuit arrangement.

A further object of this invention is to provide a thermal type flowmeter which has a temperature-compensating thermo-sensitive resistor to accurately measure the flow rate, and which is capable of preventing the current which is passing through a power supply circuit for supplying a power to a control circuit of the thermal type flowmeter from becoming large.

A further object of this invention is to provide a thermal type flowmeter which is capable of reducing the affect of the internal offset voltages of the operational amplifier for controlling the amount of energy applied to the thermo-sensitive resistor, the operational amplifier and the temperature-compensating thermo-sensitive resistor.

In accordance with the present invention, there is provided a thermal type flowmeter for measuring a flow rate of a fluid in accordance with a heating quantity of a heating resistor. The flowmeter includes a thermo-sensitive resistor provided within a fluid passage which generates heat when being energized, an electric power adjusting element provided in series with the thermo-sensitive resistor for adjusting the amount of electric power supplied to the thermo-sensitive resistor in accordance with a current inputted to an input terminal of the electric power adjusting element, a control circuit for outputting an adjustment signal for adjusting the amount of electric power to the thermo-sensitive resistor so that the thermo-sensitive resistor has a predetermined temperature, a constant current source circuit connected to the input terminal of the electric power adjusting element to supply a predetermined constant current thereto, and a current adjusting circuit connected to the input terminal of the electric power adjusting element and arranged to divide the constant current from the constant current source circuit in accordance with the adjustment signal from the circuit, thereby adjusting the input current to the electric power adjusting element.

According to this invention, the input current is inputted from the constant-current source circuit to an input terminal of the electric power adjusting element. It is therefore possible to lower the minimum voltage necessary for the supply of input current to the electric power adjusting element as compared with the minimum voltage necessary when the input current is supplied from the control circuit. A lower minimum voltage is possible in this case because the voltage drop of the output circuit of the control circuit is not added. Accordingly, it is possible to lower the minimum operating voltage allowing the measurement of the flow rate.

Further, according to this invention, a constant-voltage circuit is provided so that the control circuit is operable in response to the supply of the constant voltage from the constant-voltage circuit. On the other hand, the constant-current source circuit and the electric power adjusting element are arranged to receive power without using the constant-voltage circuit. Thus, it is possible to prevent the minimum operating voltage from being increased due to the voltage drop of the constant-voltage circuit. In addition, the operation of the control circuit is limited by the constant voltage, and therefore the operation of the electric power adjusting element to be controlled by the control circuit is also limited. That is, it is possible to prevent the applied voltage to the thermo-sensitive resistor from becoming excessive, thereby protecting the thermo-sensitive resistor.

Moreover, according to this invention, the current adjusting circuit which is used to divide the constant current from the constant-current source circuit generates a voltage drop higher than the minimum operating voltage of the electric power adjusting element. Thus, the electric power adjusting element energizes the thermo-sensitive resistor immediately after power is supplied to the thermal type flowmeter. Accordingly, it is possible to reliably start the feedback control due to the control circuit with a simple circuit.

Preferably, the flowmeter further comprises a second temperature-compensating thermo-sensitive resistor provided within the fluid passage and connected in parallel to the first-mentioned thermo-sensitive resistor for detecting fluid temperature, and a temperature-compensating operational amplifier for adjusting a supply electric power to the second thermo-sensitive resistor. The flowmeter further comprises a transistor provided in series with the second thermo-sensitive resistor for adjusting the amount of electric power supplied to the second thermo-sensitive resistor in accordance with an output of the operational amplifier. The internal offset voltage of an operational amplifier for controlling a temperature of the first-mentioned thermo-sensitive resistor, and an internal offset voltage of the operational amplifier for adjusting the supply electric power to the second thermo-sensitive resistor are both developed with respect to a voltage which corresponds to the amount of electric power supplied to the first thermo-sensitive resistor to have opposite polarities. In addition, the flowmeter comprises a resistor connected in series with the first thermo-sensitive resistor. That resistor generates a first voltage signal corresponding to the amount of electric power supplied to the first thermo-sensitive resistor. A voltage-dividing resistor circuit is provided in parallel to the first thermo-sensitive resistor to generate a second voltage signal corresponding to a voltage applied to the first thermo-sensitive resistor. Additionally, a resistor is provided in series with the second thermo-sensitive resistor to generate a third voltage signal corresponding to an amount of electric power supplied to the second thermo-sensitive resistor, where the first voltage signal is inputted to an non-inverting input terminal of the operational amplifier for controlling the temperature of the first thermo-sensitive resistor, the third voltage signal is inputted to an inverting input terminal of the operational amplifier for controlling the temperature of the first thermo-sensitive resistor. The second voltage signal is inputted to a non-inverting input terminal of the operational amplifier for adjusting the energization electric power to the second thermo-sensitive resistor, and a terminal voltage of the second thermo-sensitive resistor is inputted to an inverting input terminal of the operational amplifier for adjusting the energization electric power to the second thermo-sensitive resistor.

In accordance with this invention, there is also provided a thermal type flowmeter for measuring a flow rate of a fluid in accordance with a heating quantity of a heating resistor. That flowmeter includes the following: a constant voltage power circuit for inputting a supply voltage from a power source to output a predetermined constant voltage; a thermo-sensitive resistor provided within a fluid passage which generates heat while being energized; an electric power adjusting element provided in series with the thermo-sensitive resistor for adjusting the amount of electric power supplied from the power source to the thermo-sensitive resistor in accordance with an input current to an input terminal of the electric power adjusting element; a control circuit operable in response to the constant voltage from the constant voltage power circuit for generating an adjustment signal to adjust the amount of electric power supplied to the thermo-sensitive resistor so that the thermo-sensitive resistor maintains a predetermined temperature; a constant current source circuit operable in response to the supply voltage from the power source and connected to the input terminal of the electric power adjusting element for supplying a predetermined constant current to the electric power adjusting element; and a current adjusting circuit connected to the input terminal of the electric power adjusting element and arranged to divide the constant current from the constant current source circuit in accordance with the adjustment signal from the control circuit so as to adjust a current to be inputted to the electric power adjusting element.

Further, according to this invention, there is provided a thermal type flowmeter for measuring a flow rate of a fluid in accordance with a heating quantity of a heating resistor. That flowmeter includes the following: a constant voltage circuit for inputting a supply voltage from a power source to output a predetermined constant voltage; a thermo-sensitive resistor provided within a fluid passage which generates heat while being energized; an electric power adjusting element constructed with a plurality of transistors darlington-coupled to each other and provided in series with the thermo-sensitive resistor which is arranged to adjust an electric power supplied from the power source to the thermo-sensitive resistor in accordance with an input current to an input terminal of the electric power adjusting element; a control circuit operable in response to the constant voltage from the constant voltage circuit and arranged to output an adjustment signal to adjust the amount of electric power supplied to the thermo-sensitive resistor so that the thermo-sensitive resistor maintains a predetermined temperature; a constant current source circuit responsive to the supply voltage from the power source for generating predetermined constant currents; and a multi-step emitter-follower circuit comprising a plurality of transistors. The number of transistors in the emitter-follower circuit is greater than the number of the darlington-coupled transistors constituting the electric power adjusting element, where the emitter-follower circuit includes: a first-step transistor for inputting the adjustment signal from the control circuit through its base terminal, the emitter terminal of the first-step transistor being connected to a base terminal of a next-step transistor; a plurality of intermediate-step transistors, a base terminal of each of the intermediate-step transistors being connected to the emitter terminal of a previous-step transistor and the emitter terminal of each of the intermediate-step transistors being connected to the base terminal of a next-step transistor; and a final-step transistor for inputting the constant current from the constant current source circuit through its emitter terminal, the emitter terminal of the final-step transistor being connected to the input terminal of the electric power adjusting element and a base terminal of the final-step transistor being connected to an emitter terminal of a transistor previous to the final-step transistor.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
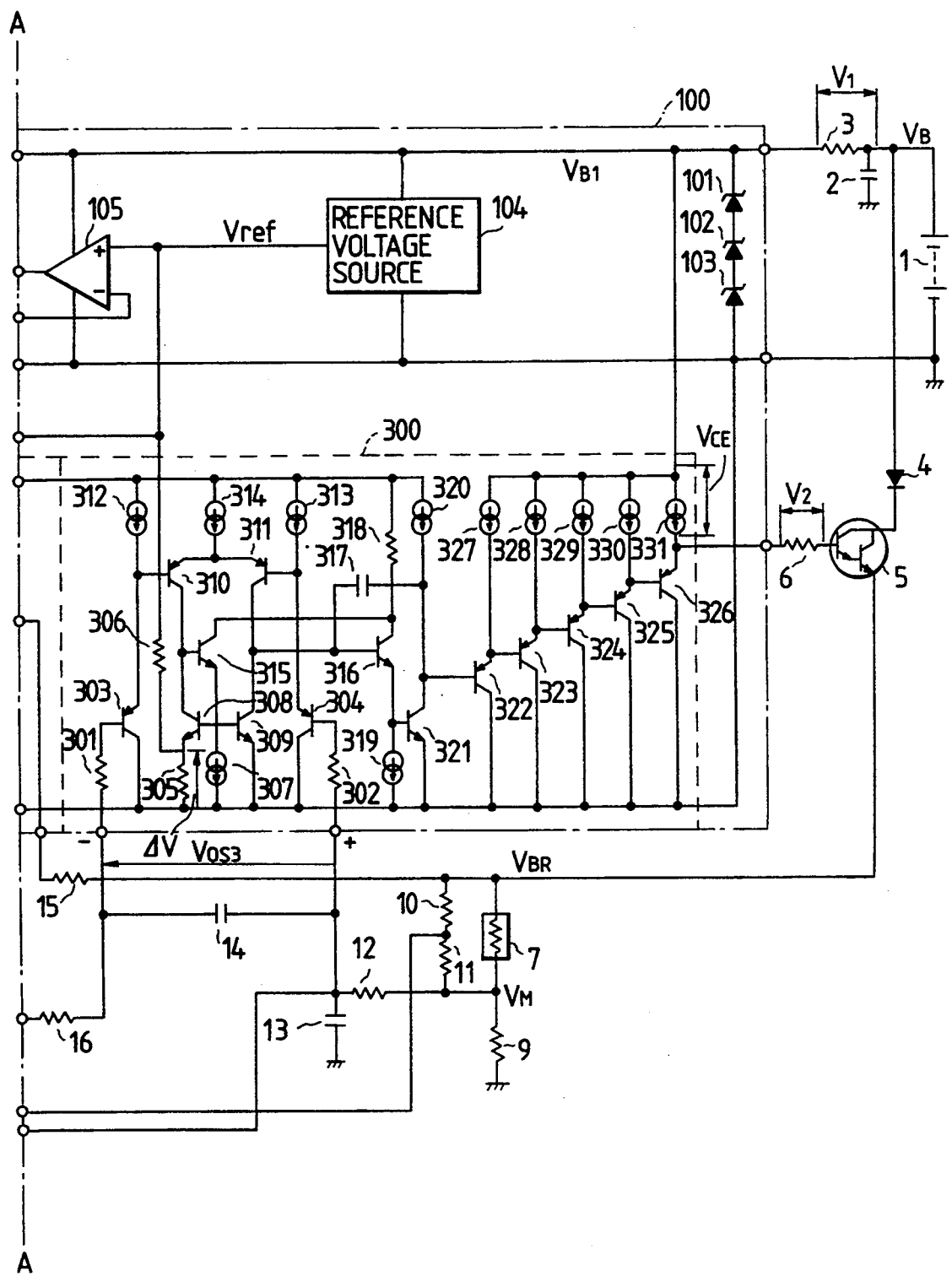
FIGS. 1 and 2 are partial illustrations of a circuit arrangement of a thermal type flowmeter according to a first embodiment of the present invention.
Figure 2:
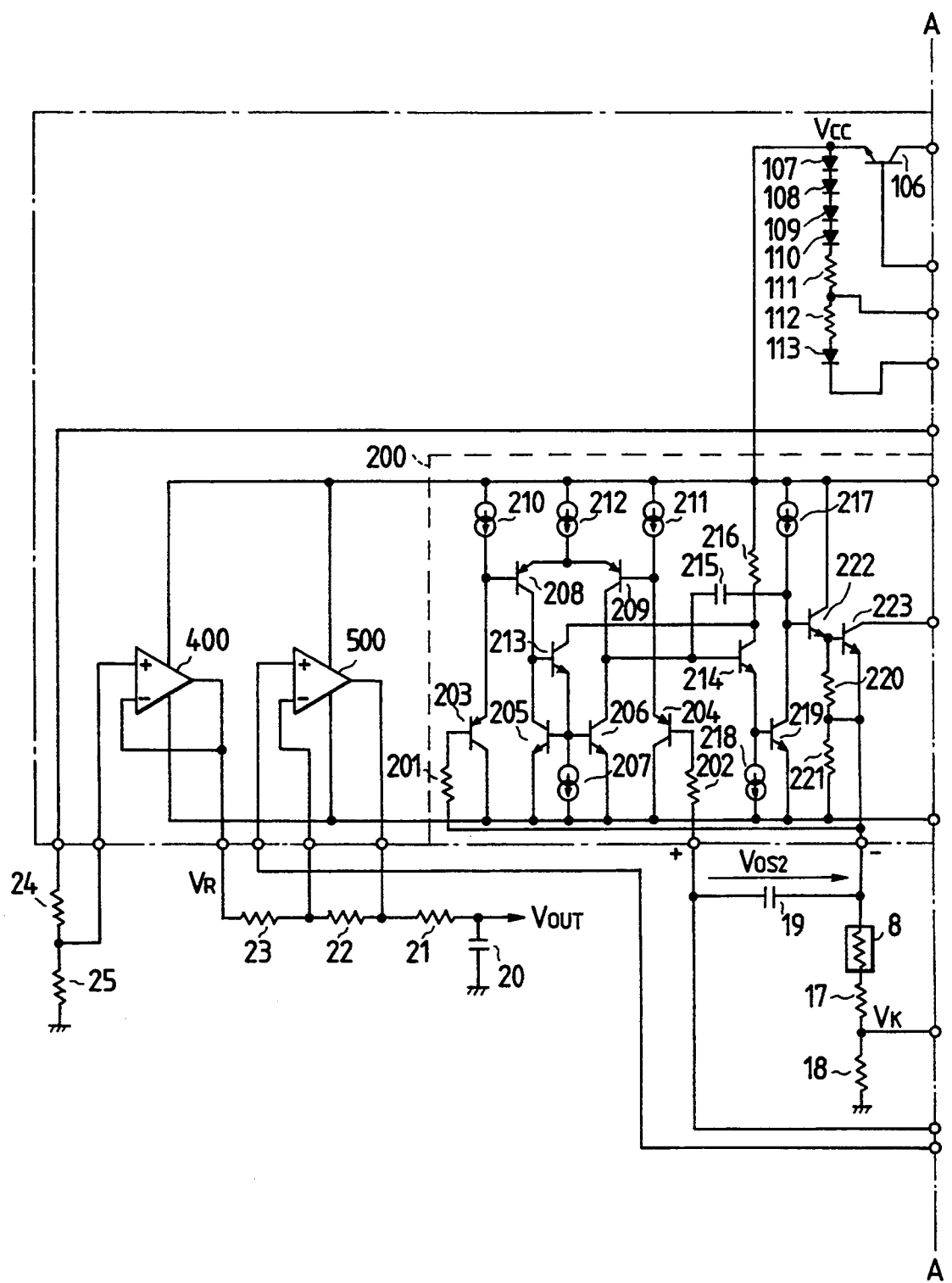

Referring now to FIGS. 1 and 2, a description will be made hereinbelow in terms of a circuit of a thermal type flowmeter according to a first embodiment of the present invention, the circuit is continued from a line A—A of FIG. 1 to a line A—A of FIG. 2. This first embodiment is arranged such that a thermo-sensitive resistor is provided in a bypass passage formed with respect to an intake air passage of an internal combustion engine of a motor vehicle. That thermo-sensitive resistor enables the circuit to measure the intake air quantity to the internal combustion engine. In FIGS. 1 and 2, this circuit is coupled to a battery 1 which is mounted on the motor vehicle and which comprises a noise-removing battery 1 which is mounted on the motor vehicle and which comprises a noise-removing capacitor 2, a current-limiting resistor 3 and a protection diode 4. The protection diode 4 is provided in order to prevent a thermo-sensitive resistor 7 from being damaged in case that the power supply line becomes the negative voltage with respect to the ground. For example, this condition may occur when the circuit is reversely connected to the terminals of the battery 1. The circuit also comprises a two-step power transistor assembly 5 constituting an emitter-follower circuit, resistor 6 coupled to the base of the power transistor assembly 5, and thermo-sensitive resistors 7, 8 to be provided in the air passage. The thermo-sensitive resistors 7 and 8 have the same resistance, thermal capacity and shape, and each of the thermo-sensitive resistors 7 and 8 is constructed with a platinum wire being wound around a bobbin made of an insulating material such as a ceramic. Further, included are a first fixed resistor 9 for converting the current flowing through the first thermo-sensitive resistor 7 into the corresponding voltage, resistors 10 and 11 which constitute a voltage divider for dividing the voltage across the first thermo-sensitive resistor 7, a resistor 12, noise-removing capacitors 13 and 14, resistors 15 and 15, a second fixed resistor 17, a third fixed resistor 18, noise-removing capacitors 19 and 20, a circuit-protection resistor, resistors 22 and 23, and resistors 24 and 25 which also constitute a voltage divider for diving the output voltage Vref of a reference voltage source 104 which will be described hereinafter.

Designated at numeral 100 is a range constructed as a monolithic IC which includes Zener diodes 101 to 103 for protection of monolithic IC 100, a reference voltage source 104 which is of the band-gap type, an operational amplifier 105, a transistor 106, diodes 107 to 110, resistors 111, 112, and a diode 113. Elements 105 to 113 constitute a constant voltage power supply circuit based on the output voltage Vref of the reference voltage source 104. Further, designated at numeral 200 is an operational amplifier comprising resistors 201 and 202, a pair of PNP transistors 203 and 204, a pair of NPN transistors 205 and 206, a constant current source 207, a pair of PNP transistors 208 and 209, a pair of constant current sources 210 and 211, a current source 212, a pair of transistors 213 and 214, a phase compensating capacitor 215, a resistor 216, constant current sources 217 and 218, a voltage inversion amplifying NPN transistor 219, resistors 220 and 221, and NPN transistors 222 and 223. In the operational amplifier 200, the emitter of the transistor 223 which is the output terminal of the operational amplifier 200 is coupled through the resistor 201 to the base of the transistor 203 so as to constitute a voltage-follower circuit. Further, each of the current sources 207, 210, 211, 212, 217 and 218 are constructed as a current miller circuit including PNP transistors so as to supply a constant current which does not depend on the supply voltage ($V_B$). Still, further designated at numeral 300 is an operational amplifier comprising resistors 301 and 302, a pair of PNP transistors 303 and 304, resistors 305 and 306, a constant current source 307, a pair of NPN transistors 308 and 309, a pair of PNP transistors 310 and 311, a pair of constant current sources 312 and 313, a constant current source 314, a pair of transistors 315 and 316, a phase compensating capacitor 317, a resistor 318, a constant current sources 319 and 320, a voltage inversion amplifying NPN transistor 321, PNP transistors 322 to 326, and constant current sources 327 to 331. The resistors 305 and 306 divide the reference voltage Vref of the reference voltage source 104. Resistor 305 is provided at the emitter side of the transistor 308, whereby the offset voltage is applied to the operational amplifier 300. Each of the current sources 312, 313, 314, 319 and 320 is constructed as a current miller circuit including PNP transistors so as to supply a constant current which does not depend on the supply voltage ($V_B$).

Numerals 400 and 500 respectively represent operational amplifiers. Of the circuits shown in FIGS. 1 and 2, the operational amplifiers 200, 300 and the circuit comprising the elements 5 to 19 constitute the bridge circuit and the control circuit therefor. Further, the operational amplifiers 400, 500 and the circuit comprising the elements 20 to 25 constitute the output circuit for amplifying and outputting the voltage $V_M$ from the bridge circuit which has the correlation with the flow rate.

Secondly, the following is a description of the operations of the circuit portions thus arranged. In response to supply of the power from the battery, the reference voltage source 104 outputs the reference voltage Vref. This reference voltage Vref is produced by a band-gap type circuit so as to be about 1.2 V and to have an excellent temperature characteristic. On the basis of the reference voltage Vref, the constant voltage power supply circuit comprising the elements 105 to 113 produces a constant voltage $V_{CC}$ which is in turn supplied as a power to the other circuits. In this constant voltage circuit, the constant voltage $V_{CC}$ is given in accordance with the following equation (1).

$$VCC = \frac{Vref - VF}{R112} \times (R111 + R112) + 5 \times VF \qquad (1)$$

where R111 and R112 respectively represent the resistance values of the resistors 111 and 112, and $V_F$ represents the forward voltage drop of the diodes 107 to 110 and 113 coupled in series with each other.

The forward voltage drop $V_F$ has a temperature dependency which can be measured in units of about $-$mV/° C., and hence a temperature dependency is given to the constant voltage $V_{CC}$.

The operation of the bridge circuit will be described hereinbelow. The description will first be made regarding operation of the bridge circuit upon initial application of power to the apparatus. In response to supply of the power to the apparatus, the constant voltage $V_{CC}$ is supplied. In this embodiment, at the output section of the operational amplifier 300 there is provided the emitter-follower circuit comprising the transistors 322 to 326 for driving the power transistor assembly 5. The emitter voltage of the transistor 326 is increased by the collector voltage of the transistor 321. Thus, the voltage at the emitter terminal of the transistor 326 is maintained within a predetermined range without reference to the voltages applied to the bases of the input transistors 303 and 304 of the operational amplifier 300. Here, when the forward voltage drop between the emitter and base of each of the transistors 332 to 326 is taken to be $V_{BE1}$, the minimum volume $V_{E(MIN)}$ and maximum value $V_{E(MAX)}$ of the emitter terminal voltage $V_E$ of the transistor 326 can be expressed in accordance with the following equations (2) and (3).

$$V_{E(MIN)} = 5 \times V_{BE1} \qquad (2)$$

$$V_{E(MAX)} = 5 \times V_{BE1} + V_{CC} \qquad (3)$$

When the voltage is developed at the emitter terminal of the transistor 326 as described above, the transistor assembly 5 constituting the emitter-follower circuit is energized. When this occurs, the emitter voltage of the transistor assembly 5 is held within a predetermined range irrespective of the input of the operational amplifier 300.

The minimum value $V_{BR(MIN)}$ and maximum value $V_{BR(MAX)}$ of the transistor assembly 5 emitter voltage $V_{BR}$ can be expressed in accordance with following equations (4) and (5).

$$V_{BR(MIN)} = 5 \times V_{BE1} - 2 \times V_{BE2} \qquad (4)$$

$$V_{BR(MAX)} = 5 \times V_{BE1} + V_{CC} - 2 \times V_{BE2} \qquad (5)$$

Here, in the equation (4), the forward voltage drop between the base and emitter of each of the transistors of the two-step darlington-coupling transistor assembly 5 is taken as $V_{BE2}$, and the forward voltage drop between the base and emitter of the transistor assembly 5 is taken as $2 \times V_{BE2}$. When $V_{BE1}$ and $V_{BE2}$ are about 0.7 (V) at the ordinary temperature, $V_{BR}$ takes a voltage within a range of 2.1 to $V_{CC} + 2.1$ (V).

With the above-described operation, a voltage within a predetermined range is applied to the bridge circuit and thermo-sensitive resistors 7 and 8 without reference to the input state of the operational amplifier 300. The voltages $V_M$ and $V_K$ are thus developed which are the inputs of the operational amplifier 300. At this time, because the supply of the power has just been applied, the first thermo-sensitive resistor 7 is not yet heating. Hence, the relation between $V_M$ and $V_K$ becomes $V_M > V_K$. Accordingly, the output (the emitter voltage of the transistor 326) of the operational amplifier 300 becomes $V_{CC} + 5 \times V_{BE1}$ and the emitter voltage of the transistor assembly 5 becomes $5 \times V_{BE1} + V_{CC} - 2 \times V_{BE2}$ which is the maximum voltage. As a result, the maximum current is supplied to the thermo-sensitive resistor 7, whereby the thermo-sensitive resistor 7 heats to increase its resistance value, thereby lowering the voltage $V_M$. At this time, the operational amplifier 300 controls the transistor assembly 5 so that $V_M = V_K$.

As described above, in this embodiment, since the possible maximum value of the emitter terminal voltage of the transistor assembly 5 is limited, irrespective of the supply voltage $V_B$ of the battery varying, it is possible to prevent the emitter terminal voltage $V_{BR}$ from being excessively increased. For example, even if the battery voltage becomes much higher than the generally used voltage, or even if $V_M$ and $V_K$ take abnormal values due to some disturbance noises, the voltage $V_{BR}$ can be prevented from being excessively increased so that the thermo-sensitive resistor can be protected.

Further, as well known, the forward voltage drop $V_{BE}$ between the base and emitter of the transistor has a temperature characteristic of about $-2$ (mV/° C.). Hence, as shown in the equations (4) and (5), the voltage $V_{BR}$ has a temperature characteristic of $3 \times V_{BR}$. Accordingly, in this embodiment, the diodes 107 to 110 and 113 are used for the constant voltage power supply circuit so as to give a temperature characteristic of about $+6$ (mV/° C.), to the voltage $V_{CC}$. This temperature characteristic cancels the variation of the maximum value of the voltage $V_{BR}$ due to the aforementioned temperature characteristic of $3 \times V_{BR}$. Therefore, the maximum value of the voltage $V_{BR}$ can be kept to be substantially constant irrespective of the temperature and the supply voltage $V_B$. Here, the maximum value of the voltage $V_{BR}$ is set to be slightly higher than the voltage corresponding to the case that the flow rate to be detected takes a maximum, while maintaining a value which allows the protection of the bridge circuit portion such as the thermo-sensitive resistor.

Secondly, a description will be made hereinbelow in terms of the operation effected after the bridge circuit has been energized. The bridge circuit basically comprises the operational amplifiers 200, 300, the transistor assembly 5, the thermo-sensitive resistors 7 and 8, and fixed resistors 9 to 11, 17 and 18. For the description, the resistance value of the first thermo-sensitive resistor 7 is taken to be RH, the resistance value of the second thermo-sensitive resistor 8 is taken to be $R_K$, the resistance value of the first fixed resistor 9 is taken as R9, the resistance value of the second fixed resistor 17 is taken as R17, the resistance value of the third fixed resistor 18 is taken as R18, and the resistance values of the fixed resistors 10 and 11 are respectively taken as R10 and R11. In the illustration, $V_{BR}$, $V_M$ and $V_K$ respectively represent the voltages.

In response to the energization to the bridge circuit due to the operation effected at the time of the start, the input voltages for the operational amplifiers 200 and 300 are generated and the input voltage for the operational amplifier 300 satisfies the condition as expressed by the following equation(6).

$$V_M + V_{OS3} = V_K \tag{6}$$

On the other hand, the input voltage for the operational amplifier 200 satisfies the condition as expressed by the following equation (7).

$$V_K = \left[ \frac{V_{BR} - V_M}{R10 + R11} \times R11 + V_M + V_{OS2} \right] \times \frac{R18}{RK \times R17 \times R18} \tag{7}$$

If substituting the equation (7) into the equation (6), the following equation (8) can be obtained. If rearranging it by substituting the voltage $V_{BR}$ of the following equation (9) thereinto, the following (10) can be obtained. This equation (10) is the balancing conditional equation for the bridge circuit. Here, RH<<R10+R11.

$$V_M + V_{OS3} = \left[ \frac{V_{BR} - V_M}{R10 + R11} \times R11 + V_M + V_{OS2} \right] \times \frac{R18}{RK \times R17 \times R18} \tag{8}$$

$$V_{BR} = V_M \times \frac{R_H + R9}{R9} \tag{9}$$

$$V_M + V_{OS3} = \left[ V_M \times \left[ \frac{R_H + R9}{R9} - 1 \right] \times \frac{R11}{R10 + R11} + V_M + V_{OS2} \right] \times \frac{R18}{R_K + R17 + R18} \tag{10}$$

In the aforementioned equation, $V_{OS3}$ is the offset voltage of the operational amplifier 300. This voltage $V_{OS3}$ depends upon the offset voltage $\Delta V$ obtained by dividing the voltage Vref, which is the output voltage of the reference voltage source 104, by the voltage divider comprising the resistors 306 and 305. This voltage further depends upon the internal offset voltage $V_{OS3D}$ which is different than the offset voltage $\Delta V$, where $V_{OS3D}$ is developed within the operational amplifier 300. That is, it can be expressed in accordance with the following equation (11).

$$V_{OS3} = \Delta V + V_{OS3D} \tag{11}$$

The voltage $V_{OS3D}$ is the internal offset voltage basically developed due to the mismatching between the paired transistors 303 and 304, the paired transistors 308 and 309 and the paired transistors 310 and 311. It is further due to the mismatching between the current sources 312 and 313. The voltage $V_{OS2}$ is the internal offset voltage of the operational amplifier 200 which is developed by the same reasons as the internal offset voltage $V_{OS3}$ of the operational amplifier 300.

Here, for simplifying the following operation description, it is assumed that $V_{OS2}$ and $V_{OS3}$ are taken to be 0 (V).

If the above-mentioned equation (10) is rearranged on the assumption that the offset voltages $V_{OS2}$ and $V_{OS3}$ are 0 (V), the bridge balancing conditional equation can be expressed by the following equation (12).

$$\frac{R_H}{R9} = \frac{R_K + R17}{R18} \times \frac{R10 + R11}{R11} \tag{12}$$

In this equation (12), the right side depends upon both the resistance value $R_K$ of the second thermo-sensitive resistor 8 provided in the air passage, and the resistance values R17, R18, R10 and R11 corresponding to fixed resistors 17, 18, 10 and 11. Here, the first and second thermo-sensitive resistors 7 and 8 which are to be provided in the air passage have substantially the same resistance and the same heat capacity. Alternatively, in the second thermo-sensitive resistor 8, and the applied voltage is adjusted so as to prevent the self-heating. In this embodiment, with the voltage divider comprising the resistors 10 and 11 and the operational amplifier 200, the voltage to be applied across the second thermo-sensitive resistor 8 is set to be about 1/10 to 1/20 of the voltage ($V_{BR}-V_M$) to be applied across the first thermo-sensitive resistor 7. Thus, the temperature of the second thermo-sensitive resistor 8 becomes substantially equal to the temperature of air flowing through the air passage. The right side of the equation (12) depends upon that air temperature for that reason.

On the other hand, the left side ($R_H/R9$) of the equation (12) depends upon the resistance value $R_H$ of the first thermo-sensitive resistor 7 because R9 is the constant resistance value of the fixed resistor 9. When the current flowing through the first thermo-sensitive resistor 7 is taken to be I, the first thermo-sensitive resistor 7 provided in the air passage consumes the electric power of $I^2 R_H$ while heating. This heating electric power $I^2 R_H$ is heat-radiated into the air flowing through the air passage. Hence, the heating value correspondingly applied to the air varies in accordance with the flow rate of the air flowing through the air passage. Accordingly, the temperature and the resistance value $R_H$ vary in accordance with the air flow rate, while the operational amplifier 300 controls the amount of energy supplied from the transistor assembly 5 so that the resistance value of the first thermo-sensitive resistor 7 does not vary. That is, with the current I being changed in accordance with the air flow rate, the heating electric power $I^2 R_H$ is controlled so that $R_H$ always takes a predetermined resistance value. More specifically, $V_{BR}$ is changed so that the current I is changed. Thus, the value of the current I has a correlation with the air flow rate. In this embodiment, the voltage having the correlation with the air flow rate is detected by detecting the voltage-drop ($I \times R9$) of the first fixed resistor 9. This voltage ($V_M$) is amplified through an output circuit (which will be described hereinafter) and subsequently supplied as a flow rate signal voltage to a fuel injection quantity control apparatus, not shown.

Further, a description will be made hereinbelow in terms of the function of the second thermo-sensitive resistor 8. As described below, the second thermo-sensitive resistor 8 is arranged so that the self-heating does not substantially occur (the self-heating is preferable to be below about 1° C.), and it is arranged to measure the temperature of the air flowing through the air passage. The resistance value of the thermo-sensitive resistors 7 and 8 have a temperature dependency of 3800 ppm/° C. In this embodiment, the provision of the thermo-sensitive resistor 8 allows for compensation of temperature variations in the air flowing through the passage. Thus, the voltage ($V_M$) is obtained having the correlation with the flow rate irrespective of the temperature of the air flowing therethrough. More specifically, the temperature of the first thermo-sensitive resistor 7 is always arranged to be higher by a predetermined value than the temperature of the second thermo-sensitive resistor 8. This can easily be realized by making and solving simultaneous equations in terms of two concrete temperatures with resistance values R17 and R18 being unknown quantities. In the above-mentioned equation, the resistance values R17 and R18 can be set relative to each other. Further it is possible to determine the temperature dependency according to the temperature of the air flowing through the air passage and according to the difference between the temperatures of the first and second thermo-sensitive resistors 7 and 8 by means of the resistance values R17 and R18.

Further, a description will be made hereinbelow in terms of the offset voltages $V_{OS2}$, $V_{OS3}$ and the operation of the circuit. For obtaining the voltage $V_M$ having the correlation with the flow rate, the following equation (13) can be obtained by transforming the bridge balancing conditional equation shown by the above-mentioned equation (10). The following equation (14) can be obtained by substituting the above-mentioned $V_{OS3} = \Delta V + V_{OS3D}$ into the equation (13).

$$V_M = \left[ \frac{V_{BR} - V_M}{R10 + R11} \times R11 + V_M + V_{OS2} \right] \times \frac{R18}{R_K + R17 + R18} - V_{OS3} \quad (13)$$

$$V_M = \frac{R11 \times R18}{(R_K + R17 + R18) \times (R10 + R11) - R10 \times R18} \times \quad (14)$$

$$V_{BR} - \frac{(R_K + R17 + R18) \times (R10 + R11)}{(R_K + R17 + R18) \times (R10 + R11) - R10 \times R18} \times$$

$$\Delta V - \frac{(R_K + R17 + R18) \times (R10 + R11)}{(R_K + R17 + R18) \times (R10 + R11) - R10 \times R18} \times$$

$$V_{OS3D} + \frac{R18 \times (R10 + R11)}{(R_K + R17 + R18) \times (R10 + R11) - R10 \times R18} \times$$

$$V_{OS2}$$

If rearranging this equation (14) in terms of the offset voltage, the following equation (15) can be obtained.

$$V_M = \frac{R11 \times R18}{(R_K + R17 + R18) \times (R10 + R11) - R10 \times R18} \times \quad (15)$$

$$V_{BR} - \frac{(R_K + R17 + R18) \times (R10 + R11)}{(R_K + R17 + R18) \times (R10 + R11) - R10 \times R18}$$

$$\left[ \Delta V = V_{OS3D} - \frac{R18}{R_K + R17 + R18} \times V_{OS2} \right]$$

In this equation (15), the portion in the second parenthesis at the right side represents the total offset voltage $V_{OS}$ of the circuit arrangement of this embodiment. As seen from the equation (15), the internal offset voltage $V_{OS3D}$ of the operational amplifier 300 and the internal offset voltage $V_{OS2}$ of the operational amplifier 200 can be canceled with each other. That is, although $V_{OS3D}$ and $V_{OS2}$ are preferable to each be equal to 0 (V), this condition is never achieved. Instead, offset voltage always occurs due to the mismatching between the paired elements within the operational amplifier and others. Accordingly, in this embodiment, $V_{OS3D}$ and $V_{OS2}$ are arranged to be canceled with each other. Thus, the operational amplifiers 200 and 300 are formed within the monolithic IC 100, i.e., on one chip. Furthermore, the location of the operational amplifiers 200 and 300 on the chip, the sizes of the elements and others are optimally determined, whereby $V_{OS2}$ substantially becomes equal to $V_{OS3D}$ so that the total off set voltage $V_{OS}$ preferably approaches $\Delta V$. In addition, the temperature drifts of the internal offsets of the operational amplifiers 200 and 300 also become the same when taking $V_{OS2}$ and $V_{OS3D}$ in this arrangements.

Here, $R18/(R_K+R17+R18)$ at the right side of the equation (15) substantially depends upon the voltage division ratio due to the resistors 10 and 11. It becomes 0.7 to 0.9 if the self-heating of the second thermo-sensitive resistor 8 can be suppressed up to a negligible value (below 1° C.).

The total offset voltage $V_{OS}$ is required for stably operating the bridge circuit and further required to be a positive voltage. That is, if $V_{OS}$ is a negative voltage, feedback is made between the input and output of the operational amplifier 300 whereby the operation becomes unstable causing oscillations to occur. Here, the responsibility of the bridge circuit depends on the magnitude of the positive $V_{OS}$. More specifically, the response of the voltage $V_M$ rapidly varies changes in accordance with the value of the total offset voltage $V_{OS}$, where $V_M$ is a flow rate signal when the quantity of the air flowing through the air passage. When the total offset voltage $V_{OS}$ is high, the negative feedback of the bridge circuit increases to decrease the responsibility. When $V_{OS}$ becomes smaller, the negative feedback thereof decreases to increase the responsibility. When increasing the responsibility, undesirable ringing or the like can occur at the transition time. On the other hand, when decreasing the responsibility, difficulty is encountered in measuring the flow rate at the transition time. Thus, the total offset voltage $V_{OS}$ is required to be set to a suitable value. Generally, $V_{OS}$ is set to several mV. As a result, $V_{OS}$ is preferable to be a predetermined voltage value having as small a variation as possible. According to this embodiment, the internal offset voltage $V_{OS3D}$ of the operational amplifier 300 and the offset voltage $V_{OS2}$ of the operational amplifier 200 which act as the error factor of the total offset voltage $V_{OS}$ are canceled with each other as shown by the above-mentioned equation (15), thereby suppressing the error of the total offset voltage $V_{OS}$ to a minimum.

In this embodiment, the currents to be supplied to the first thermo-sensitive resistor 7 and the resistors 9, 10, 11 are obtained from the supply voltage $V_B$ through the transistor assembly 5. Thus, the minimum operating voltage can be lowered as compared with the case that the supply current to the first thermo-sensitive resistor 7 is obtained through the resistor 3.

Further, in this embodiment, the current to be supplied to a serial circuit comprising the second thermo-sensitive resistor 8 and the resistors 17, 18 is similarly obtained from the emitter of the transistor assembly 5. That is, the collector of the operational amplifier 200 output transistor 223 is coupled through the resistor 15 to the transistor assembly 5 emitter, and the emitter of the transistor 223 is coupled to the second thermo-sensitive resistor 8.

Here, a current to be supplied to the second thermo-sensitive resistor 8 is several mA to several tens mA. When supplying the current due to the constant voltage source $V_{CC}$, the current passing through the resistor 3 increases causing the voltage drop across the resistor 3 and the minimum operating voltage for the circuit to increase. In addition, in order to prevent this problem, when reducing the resistance value of the resistor 3, it is required to increase the capacities of the excessive-voltage preventing Zener diodes 101, 102 and 103. Such increase in capacity would usually cause an increase in the chip size and cost of the monolithic IC 100. On the other hand, according to this embodiment, since the current for the second thermo-sensitive resistor 8 is obtained from the supply voltage $V_B$ through the transistor assembly 5, the aforementioned problems do not occur. Here, since the resistor 15 is provided for reducing the consumption power of the transistor 223, it is appropriate to constitute the circuit without using the resistor 15.

As obvious from the above description of the operation, the consumption power of the first thermo-sensitive resistor 7 is feedback-controlled by the control circuit comprising the resistors 9 to 18, the operational amplifiers 200 and 300, the transistor assembly 5 and others. In this feedback control loop there is provided a voltage amplifying circuit which will be described hereinbelow. In the operational amplifier 200, there is provided a differential amplifier comprising the transistors 205, 206, 208 and 209 to voltage-amplify the difference voltage between the base terminal voltages of the transistors 203 and 204. The amplified voltage is outputted at the collector terminal of the transistor 209 and the amplification degree is generally about 60 (dB). Further, the transistor 221 performs the voltage inversion amplification. The transistor 221 itself has a voltage amplification degree of about 60 (dB). The power for these two amplifying devices is obtained from the constant voltage $V_{CC}$ of the constant voltage source through the current sources 210 to 211 and 217. All the other transistors 203, 204, 213, 214, 222, 223 within the operational amplifier 200 constitute the emitter-follower circuits and do not have the voltage amplifying functions (that is, the voltage amplification degree thereof is 1).

Similarly, the operational amplifier 300 includes a differential amplifying circuit comprising the transistors 308, 309, 310 and 311. The transistor 321 constitutes a voltage inversion amplifying circuit. The power for these amplifying circuits is obtained from the constant voltage $V_{CC}$ of the constant voltage source through the current sources 312 to 314 and 320. The other transistors 303, 304, 315, 316 and 322 to 326 make up emitter-follower circuits and do not have the voltage amplification function. Power transistor assembly 5 also constitutes an emitter-follower circuit which does not have the voltage amplification function. Accordingly, since all the powers for the voltage amplifying circuit within the feedback loop are obtained from the constant voltage $V_{CC}$ of the constant voltage source, even if the voltage $V_B$ of the power supply of the apparatus varies. However, the voltage $V_{BR}$ to be controlled in accordance with the constant voltage $V_{CC}$ does not vary.

A description will be made hereinbelow concerning the case that the voltage of the battery 1 may lower. For example, in terms of the necessary minimum value (V) of the voltage $V_B$ of the battery 1 in relation to the voltage $V_{BR}$ required for the measurement of the flow rate. For convention, the voltage drop across the resistor 3 is taken to be $V_1$, the voltage drop across the resistor 6 is taken to be $V_2$, the forward voltage drop between the base and emitter of the later transistor of the darlington power transistor assembly 5 is taken as $V_{BE1}$, the forward voltage drop between the base and emitter of the former transistor of the transistor assembly 5 is taken as $V_{BE2}$ and the minimum value of the voltage drop of the current source 331 is taken as $V_{CE(MIN)}$. Accordingly, the minimum voltage value $V_{B(MIN)}$ necessary for the measurement of the flow rate can be expressed in accordance with the following equation (16):

$$V_{B(MIN)} = V_{BR} + V_{BE2} + V_{BE1} + V_2 + V_{CE(MIN)} + V_1 \quad (16)$$

where $V_{CE(MIN)}$ represents the minimum value of the voltage drop of the current source 331 and the minimum voltage which allows supply of the base current necessary for normally operating the transistor assembly 5.

Figure 3:
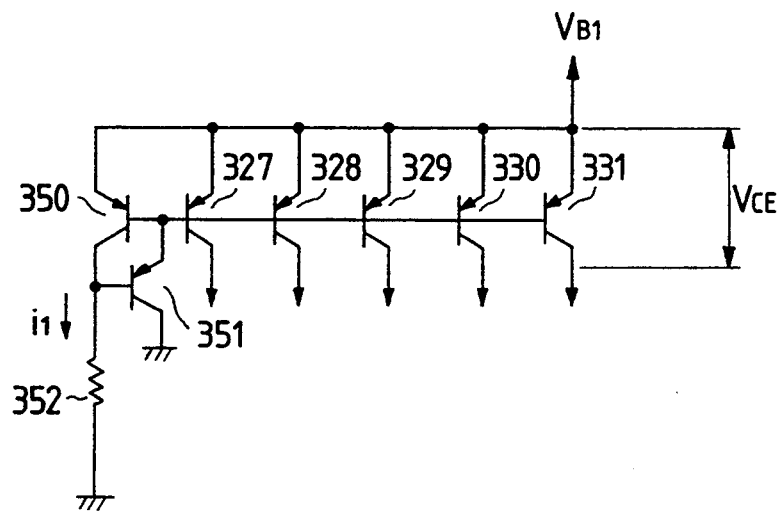
FIG. 3 shows a circuit arrangement of a constant current circuit to be used in the first embodiment of this invention.

FIG. 3 shows a detailed circuit arrangement of the constant current source. In FIG. 3, PNP transistors illustrated at numerals 327 to 331 correspond to the current sources 327 to 331 shown in FIGS. 1 and 2. The FIG. 3 current source circuit is constructed as a general current miller circuit and the basic current $I_1$ is determined in accordance with the following equation (17).

$$I_1 = \frac{V_{B1} - V_{EB350} - V_{EB351}}{R352} \quad (17)$$

where $V_{EB350}$ represents the voltage drop between the emitter and base of a transistor 350, $V_{EB351}$ designates the voltage drop between the emitter and base of a transistor 351, and R352 denotes the resistance value of a resistor 352.

In FIG. 3, the basic current I1 flows as the collector current of the transistor 350, and the transistors 327 to 331 respectively mirror and output the basic current I1. The values of the currents to be outputted from the transistors 327 to 331 are the same as that of the basic current I1 when the circuit is constructed on the same chip of a bipolar type IC and the transistor 350 and the transistors 327 to 331 are made up by the same element. In this embodiment, the current sources 327 to 330 are arranged to have the same current value, and the current source 331 is arranged to have a value which is several ten times as large as the current value of the other current sources 327 to 330 because of the base current of the power transistor assembly 5 supplied. This can be realized by making the element area of the transistor 331 larger than the element area of the transistor 350 or by providing a plurality of elements, each being the same as the transistor 350, which are coupled in parallel to each other.

Moreover, a description will be made hereinbelow in terms of the output circuit. This output circuit comprises the operational amplifiers 400 and 500, the resistors 21 to 25 and the capacitor 20. In the output circuit, the voltage $V_M$ having correlation with the flow rate is inputted from the bridge circuit to the non-inverting input terminal of the operational amplifier 500 so as to output an output voltage $V_{OUT}$ expressed by the following equation (18). Here, the resistance values of the resistors 21 to 25 are designated at references R21 to R25, and $V_R$ represents a voltage expressed in accordance with equation (19).

$$V_{OUT} = (V_M - V_R) \times \frac{R22}{R23} + V_M \quad (18)$$

$$V_R = \frac{V_{ref}}{R24 + R25} \times R25 \quad (19)$$

As expressed by the aforementioned equation (18), the output circuit has a voltage amplifying function. Further, as $V_R$ and R22/R23 are arranged in the equation (18), the $V_M$ characteristics inherent to the products may be adjusted to the same characteristic. Thus, it is possible to limit output the voltage $V_{OUT}$ to within the A/D convertible range of an A/D converter so that $V_{OUT}$ may be converted. Hence, it is possible to reduce the bit error rate at the time of the A/D conversion without wastefully using the A/D convertible range of the A/D converter. In addition, it is possible to increase the S/N ratio of the output voltage $V_{OUT}$ and the noise voltage superimposed thereon, resulting in a circuit less vulnerable to noise.

As described above, since the base current of the power transistor assembly 5 can be obtained from the constant current source 331, the minimum voltage value of the battery voltage $V_B$ necessary for the measurement of the flow rate becomes the voltage expressed by the above-mentioned equation (16). Here, in the conventional apparatus, the base current of the power transistor is generally obtained from an output transistor of an operational amplifier. The conventional operational amplifier output transistor there is generally used a darlington-coupled transistor assembly. As a result, the minimum voltage for the measurement of the flow rate is required to include the voltage drop of the output transistor. The following equation (20) shows the difference between the minimum voltage in this embodiment and the minimum voltage in the conventional apparatus. This equation (20) is made on the assumption that the voltage drops between the bases and emitters of all the transistors are equal to each other.

$$(V_{BR} + V_{BE2} + V_{BE1} + V_2 + V_{CE(MIN)} + V_1) - \quad (20)$$

$$(V_{BR} + V_{BE1} + V_{BE2} + V_2 + V_{BE3} + V_{BE4} + V_1 + V_{CE(MIN)}) =$$

$$(V_{BR} + 2V_{BE} + V_2 + V_1 + V_{CE(MIN)}) -$$

$$(V_{BR} + 4V_{BE} + V_2 + V_1 + V_{CE(MIN)}) = -2V_{BE}$$

where this embodiment is equal in $V_1$, $V_2$ and $V_{CE(MIN)}$ to the conventional apparatus.

In this equation (20), the first term at the left side is coincident with the equation (16) showing the minimum voltage, and the second term at the left side shows the minimum voltage in the conventional apparatus which is for supplying the base current from the darlington-coupled transistor assembly to the power transistor. Further, in the equation 20, $V_{BE3}$ and $V_{BE4}$ represent the voltage drops of the darlington-coupled transistor assembly.

Thus, according to this embodiment, it is possible to measure the flow rate with a battery voltage lower by 2 $V_{BE}$ (about 1.4 V) than the battery voltage in the conventional apparatus.

Figure 4:
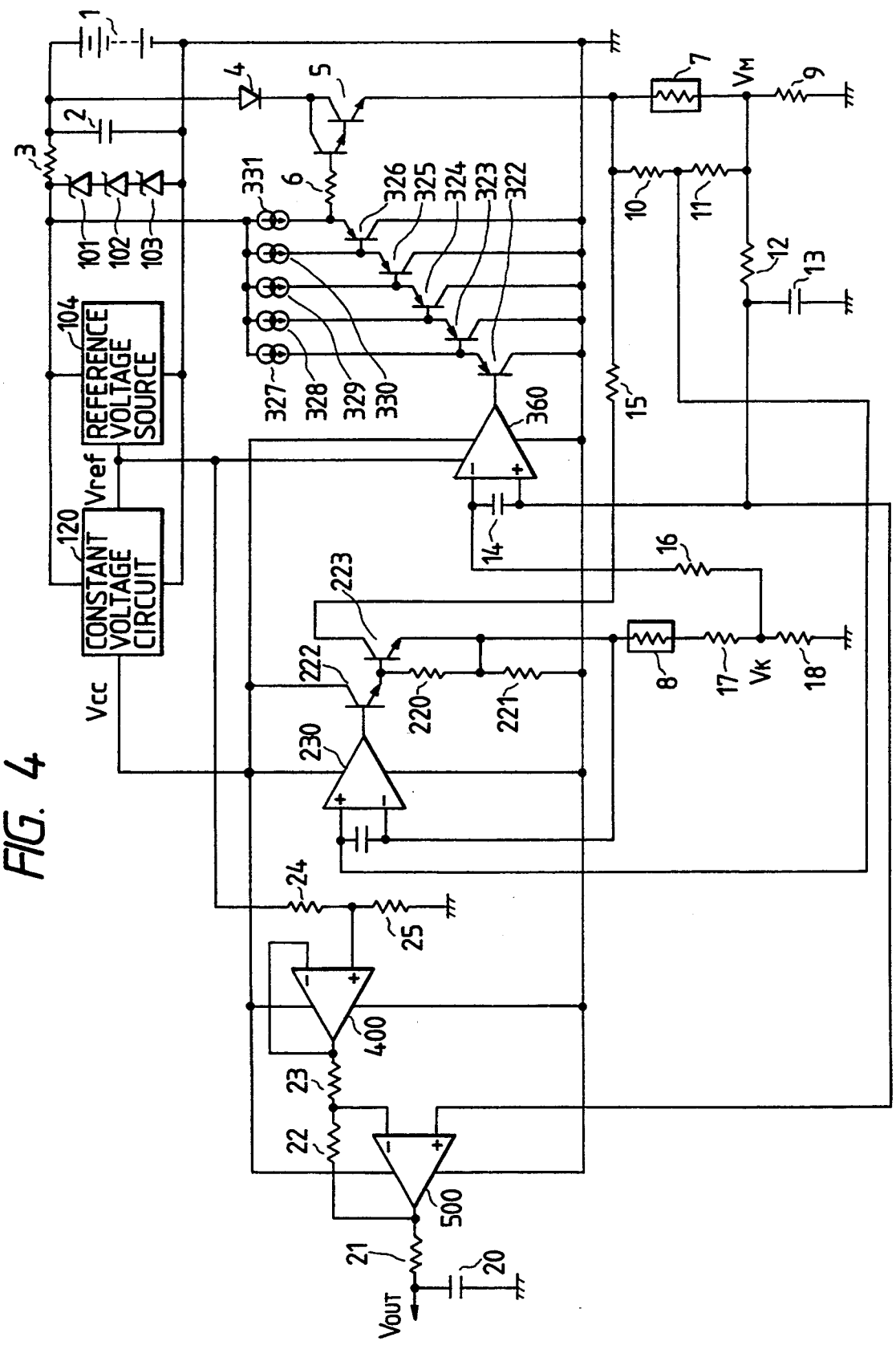
FIG. 4 is a block diagram showing a circuit arrangement of a thermal type flowmeter of the first embodiment of this invention.

FIG. 4 is a block diagram showing a circuit corresponding to the embodiment of FIGS. 1 and 2, where parts corresponding to those in FIGS. 1 and 2 are marked with the same reference numerals and characters. In FIG. 4, a constant voltage circuit 120 corresponds to a circuit comprising the elements 105 to 113 in FIGS. 1 and 2, and an operational amplifier 360 corresponds to a circuit including the elements 301 to 321 in FIGS. 1 and 2 which also includes a differential amplifying circuit, an output circuit thereof, and a resistor for setting the offset voltage.

Figure 5:
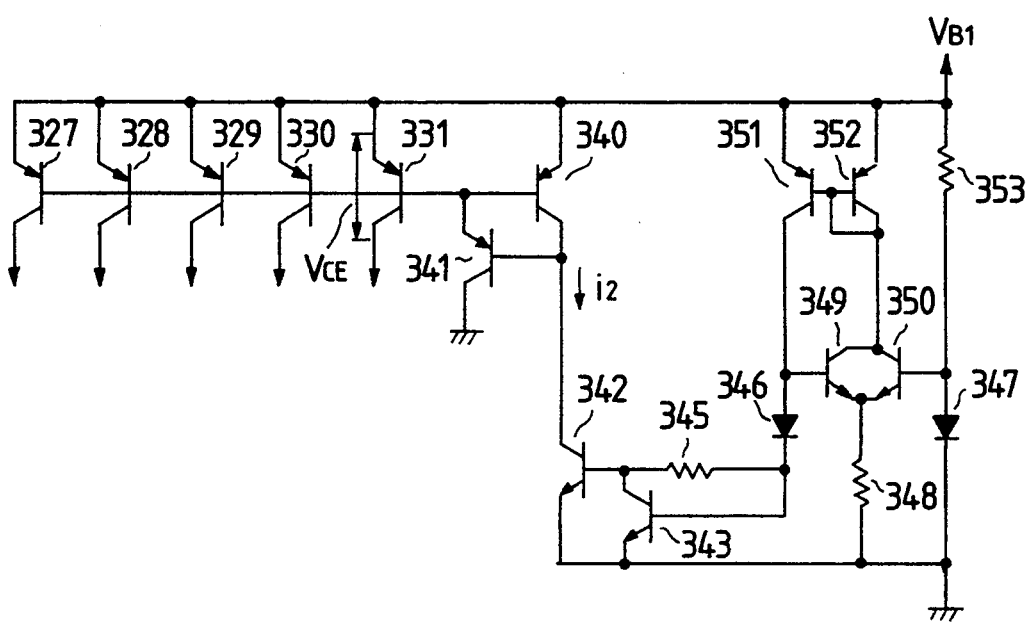
FIG. 5 is a circuit diagram showing a circuit arrangement of a constant current circuit according to a second embodiment of this invention.

FIG. 5 shows a circuit arrangement of a constant current source according to a second embodiment of this invention. Although the above-described first embodiment uses the constant current source shown in FIG. 3, it is appropriate to use the constant current source circuit shown in FIG. 5 in the second embodiment. In the FIG. 3 circuit, the basic current I1 varies in accordance with the supply voltage VB1, while in the FIG. 5 circuit the basic current I2 is arranged so as not to be affected by the supply voltage VB1. In FIG. 5, the start is effected by a resistor 353, a diode 347 and a transistor 350. The variation of the supply voltage VB1 is compensated through a circuit comprising transistors 342, 343, 349, 351, 352, a diode 346 and resistors 345, 348, thereby producing the basic current I2. The basic current I2 to be produced by the FIG. 5 circuit does not depend on the voltage VB1 and scarcely depends on the temperature if the resistance values of the resistors 348 and 345 are adequately selected.

Figure 6:
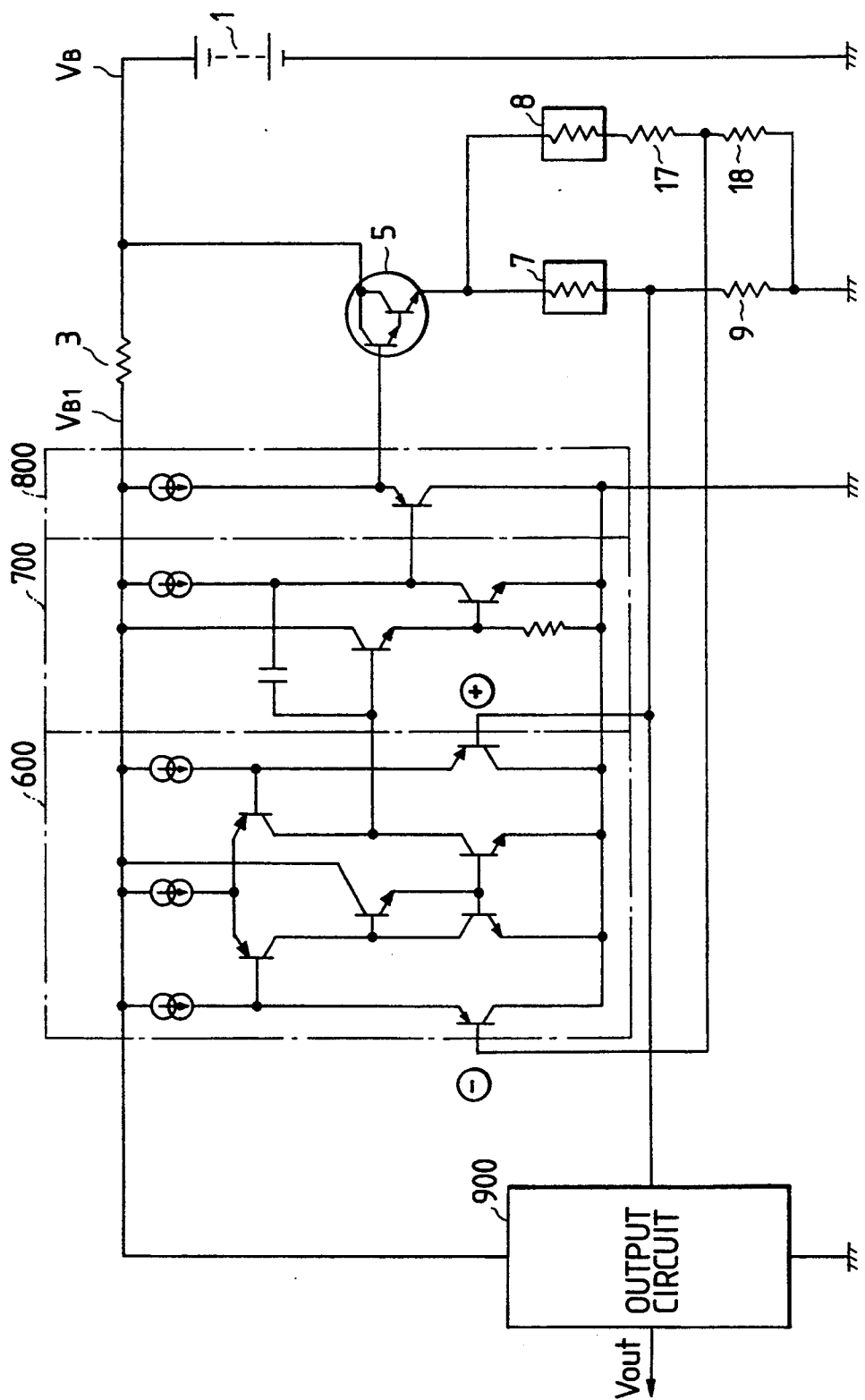
FIG. 6 is an illustration of a circuit arrangement of a thermal type flowmeter according to a third embodiment of this invention.

FIG. 6 shows an arrangement of a circuit for lowering the minimum operating voltage according to a third embodiment of this invention. In FIG. 6, parts substantially corresponding in function with those in FIGS. 1 and 2 are marked with the same numerals and characters. This circuit is extremely simplified as compared with the circuit shown in FIGS. 1 and 2. In FIG. 6, the circuit includes a deferential amplifying section 600, an inversion amplifying section 700, an output section 800, and an output circuit. The output section 800 comprises an emitter-follower transistor and a constant current source. The constant current source of the output section 800 supplies base current to a darlington-coupled transistor assembly 5. Thus, similar to this embodiment illustrated in FIGS. 1 and 2, this embodiment can lower the minimum operating voltage necessary for the measurement of the flow rate. More specifically, it can lower the minimum operating voltage by about 1.4 (V). In this embodiment, when the supply voltage $V_B$ varies due to the lag of the feedback control, the voltages to be applied to the thermo-sensitive resistors 7 and 8 temporarily varies. Further, in this embodiment, it is appropriate to input a particular trigger signal for initiating the application of the supply voltage to start the feedback loop or to initiate it using a plurality of emitter-follower circuits with a plurality of constant current sources being provided in the output section 800.

Figure 7:
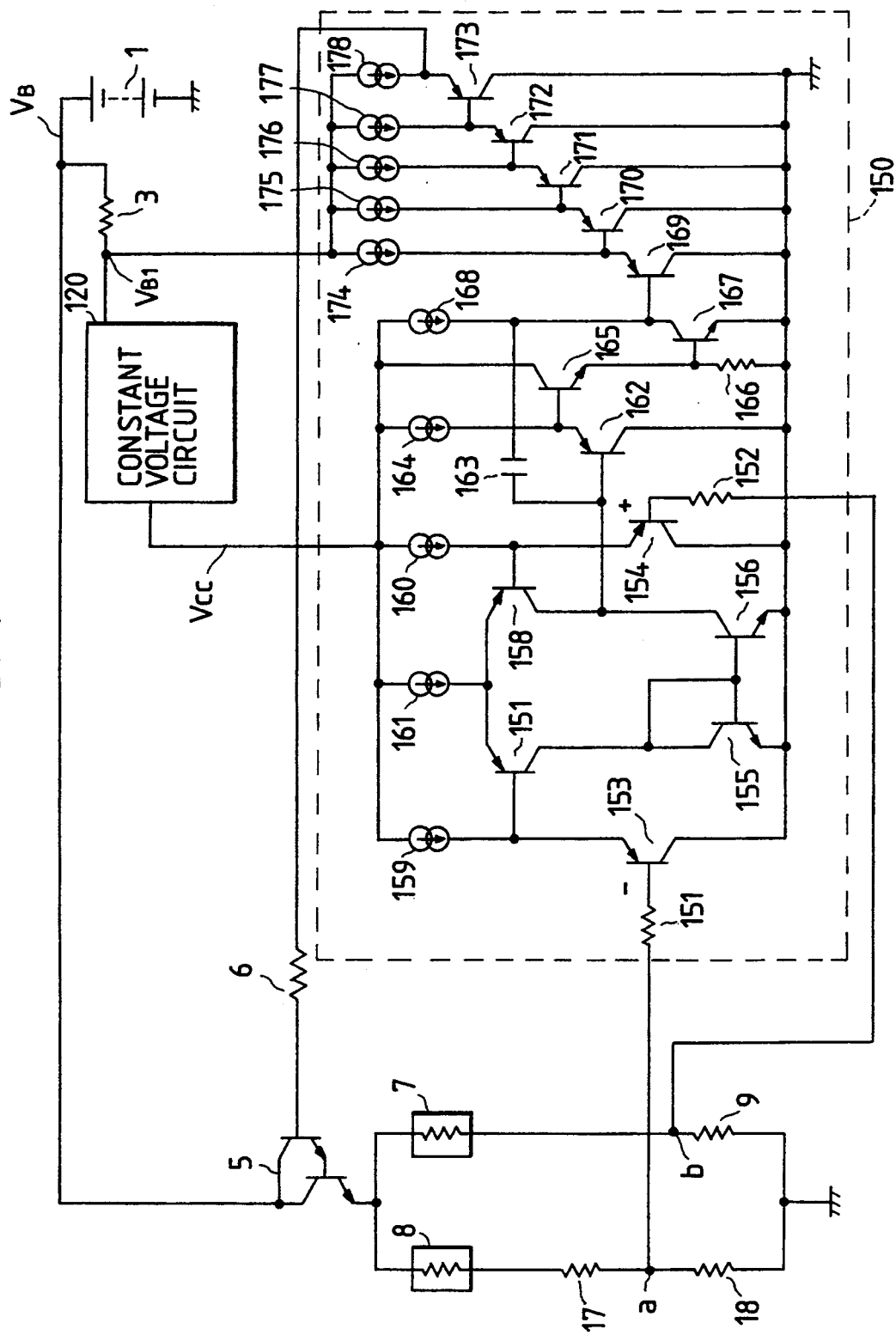
FIG. 7 is an illustration of a circuit arrangement of a thermal type flowmeter according to a fourth embodiment of this invention.

FIG. 7 shows a control circuit according to a fourth embodiment of this invention which comprises a single operational amplifier. In FIG. 7, parts substantially corresponding in function as those in FIGS. 1 and 2 are marked with the same numerals and characters. This embodiment can be simplified in structure as compared with the first embodiment of this invention. In the FIG. 7 embodiment, a constant voltage power source circuit 120 is provided for supplying a voltage to a voltage amplifying circuit in an operational amplifier 150. This constant voltage power source circuit 120 corresponds to the constant voltage power supply circuit in FIGS. 1 and 2. The operational amplifier 150 comprises a differential amplifying section, a voltage inversion amplifying section and an output section. The differential amplifying section includes input resistors 151 and 152, a pair of input transistors 153 and 154, a pair of transistors 155 and 156, a pair of transistors 157 and 158, and constant current sources 159, 160 and 161. The voltage inversion amplifying section includes transistors 162, 165 and 167, a capacitor 163, and resistor 166 and constant current sources 164 and 168. Each of the aforementioned current sources 159, 160, 161, 164 and 168 supplies a constant current which does not depend on the variation of the supply voltage ($V_B$). The output section is composed of a five-step emitter-follower circuit and is equipped with transistors 169, 170, 171, 172 and 173 and constant current sources 174, 175, 176, 177 and 178.

In this embodiment, the voltage at the junction point between the thermo-sensitive resistors 7 and 8 is outputted as a voltage indicative of the flow rate. Further, in this embodiment, the feedback control is effected through the operational amplifier 150 so that a bridge balancing condition as shown by the following equation (21) is satisfied.

$$R_H/R9 = (R_K + R17)/R18 \quad (21)$$

Moreover, in this embodiment, the operational amplifier 150 for feedback-controlling the amounts of energy supplied to the thermo-sensitive resistors 7 and 8 is equipped with the differential amplifying section, a voltage inversion amplifying section and two voltage amplifying circuits. To all the voltage amplifying circuits there is applied voltage from the constant voltage source 120. Accordingly, even if the voltage of the battery 1 varies, it is possible to prevent variation in the voltage at the emitter terminal of the transistor assembly 5 and at a b point in the bridge circuit. Further, in this embodiment, as well as the first embodiment, the voltage at the emitter terminal of the transistor assembly 5 is limited between a predetermined minimum voltage and a predetermined minimum voltage. Thus, it is possible to prevent an excessive voltage from being applied to the thermo-sensitive resistors 7 and 8. Still further, in this embodiment, as well as the first embodiment, since the minimum supply voltage necessary for the measurement of the flow rate is low, it is possible to measure the flow rate even if the supply voltage is low.

Figure 8:
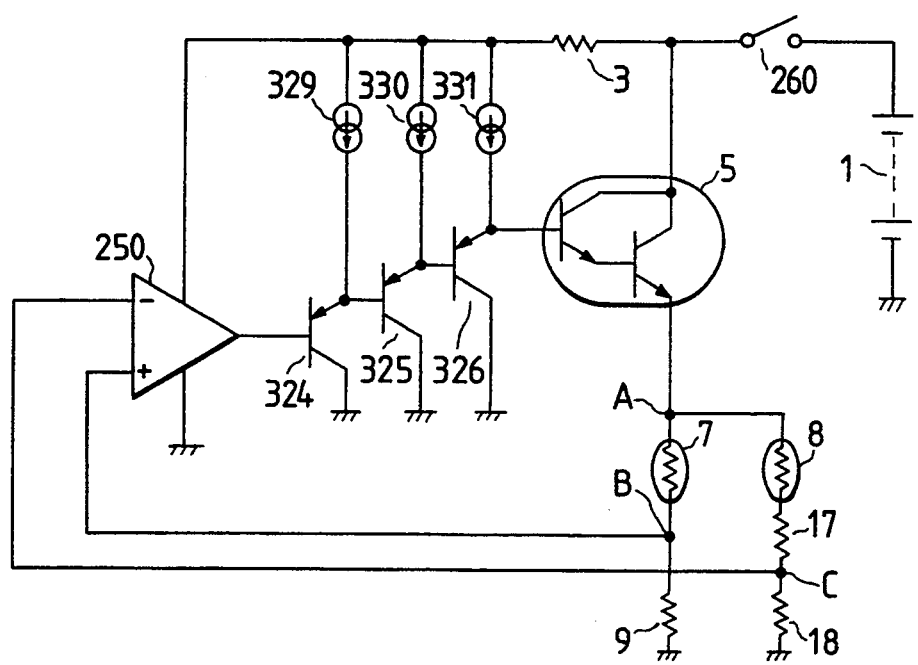
FIG. 8 is an illustration of a circuit arrangement for a thermal type flowmeter according to a fifth embodiment of this invention.

FIG. 8 shows an emitter-follower circuit for starting the feedback control loop according to a fifth embodiment of this invention. In FIG. 8, parts substantially corresponding in function those in FIGS. 1 and 2 are marked with the same numerals and characters. This fifth embodiment can be simplified in structure as compared with the first embodiment of this invention. In FIG. 8, numeral 260 is a power switch which is not shown in the drawings for the above-described embodiments. In this embodiment, the voltages at points B and C in the bridge circuit including the thermo-sensitive resistors 7 and 8 are inputted to an operational amplifier 250. A three-step emitter-follower circuit is provided at the output side of the operational amplifier 250. In this circuit, the voltage drop between the base and emitter of a darlington-coupled transistor assembly 5 becomes $2 \times V_{BE}$ and the voltage drop between the base and emitter of the three-step emitter-follower circuit becomes $3 \times V_{BE}$. Thus, the base voltage of the transistor assembly 5 is higher with one transistor. As a result, it is possible to reliably energize the transistor assembly 5 immediately after the closing of the power switch 260 to start the feedback loop. Further, in this embodiment, as well as the first embodiment, since the minimum supply voltage necessary for measurement of the flow rate is low, it is possible to measure the flow rate even if the supply voltage is low.

Figure 9:
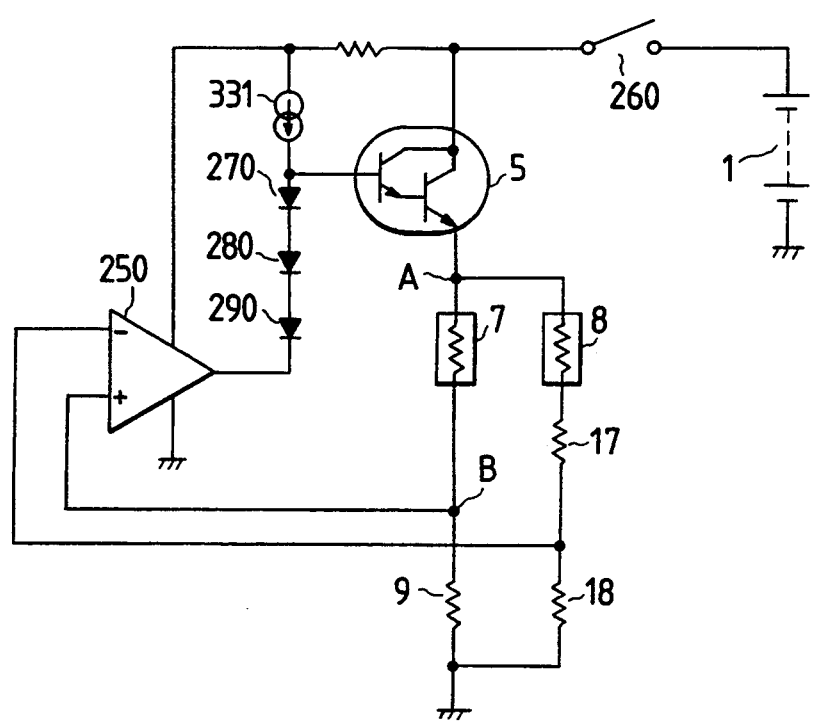
FIG. 9 is an illustration of a circuit arrangement of a sixth embodiment of this invention.

FIG. 9 shows a feedback control loop starting circuit which comprises diodes according to a sixth embodiment of this invention. In FIG. 9, parts substantially corresponding in function with those in FIGS. 1 and 2 are marked with the same numerals and characters. The structure of this sixth embodiment is extremely simplified as compared with the first embodiment. In FIG. 9, the voltages at points B and C in the bridge circuit including the thermo-sensitive resistors 7 and 8 are inputted to an operational amplifier 250. Additionally, a serial circuit comprising diodes 270, 280 and 290 is provided at the output side of the operational amplifier 250. The anode sides of these diodes 270 to 290 are coupled both to a constant current source 331, and to the base terminal of a transistor assembly 5. Here, numeral 260 is a power switch which is not shown in the drawings for the first embodiment. In this circuit, the voltage drop between the base and emitter of the darlington-coupled transistor assembly 5 becomes $2 \times V_{BE}$, and the forward voltage drop of the three-diode serial circuit becomes $3 \times V_D$. Generally, since the voltage drop $V_{BE}$ between the base and emitter of the transistor is substantially equal to the forward voltage drop $V_D$ of the diode, the base voltage of the transistor assembly 5 becomes higher by a value corresponding to the forward voltage drop of one diode. Thus, it is possible to reliably energize the transistor assembly 5 immediately after the closing of the power switch 260 to start the feedback control loop. Further, in this embodiment, the constant current source 331 is provided at the anode side of the diode serial circuit to generate the base current of the transistor assembly 5. The voltage for energizing the transistor assembly 5 to operate the bridge circuit does not include the voltage drop of the output circuit within the operational amplifier 250. As a result, since the minimum supply voltage necessary for the measurement of the flow rate can be set to be low, it is possible to measure the flow rate even if the supply voltage is low.

Figure 10:
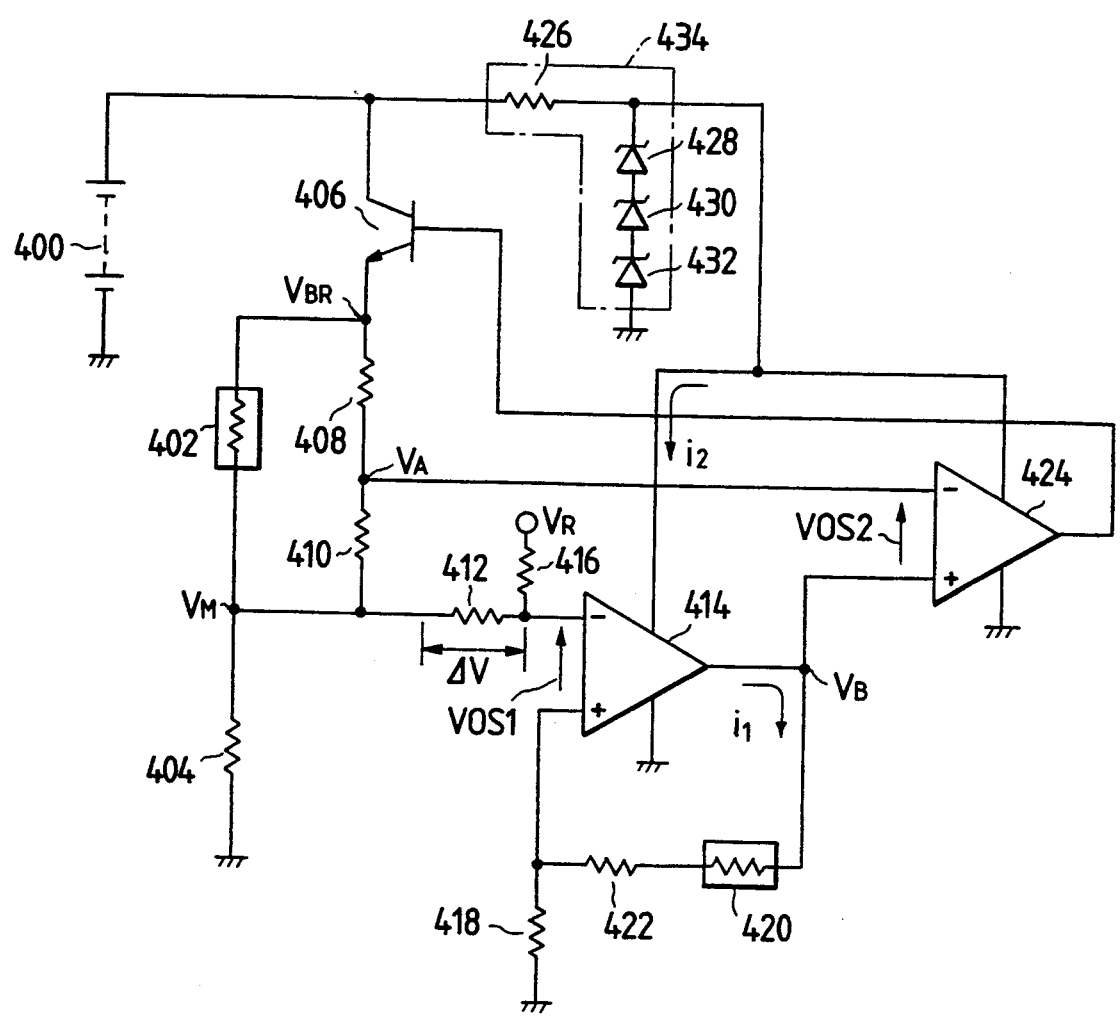
FIG. 10 shows a circuit arrangement to be compared with this invention.
Figure 11:
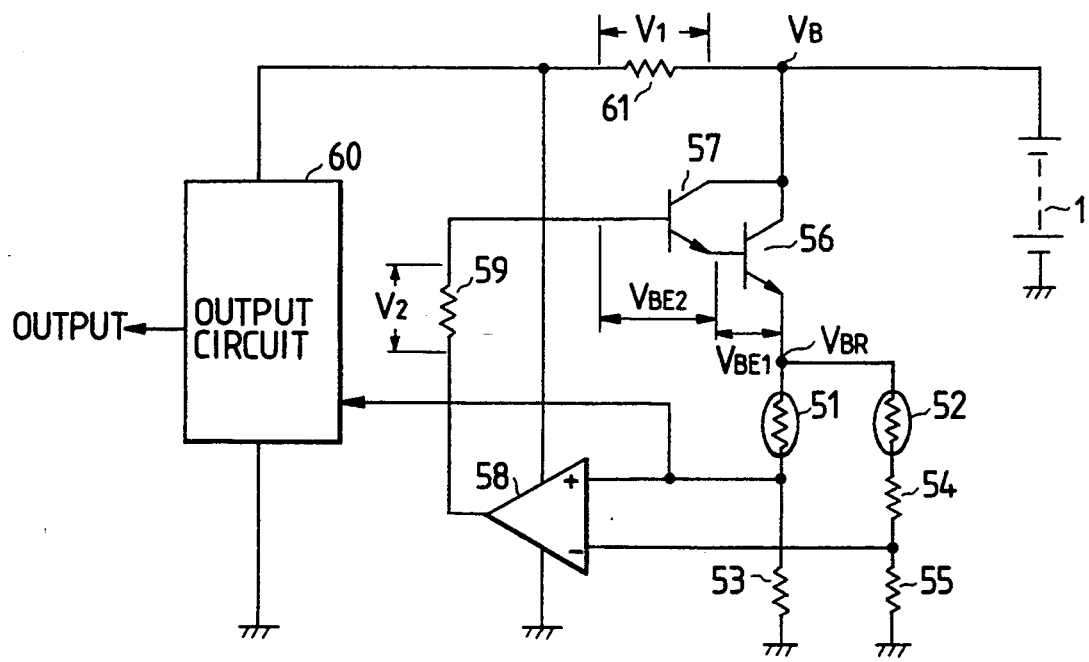
FIGS. 11 and 12 show circuit arrangements of a conventional thermal type flowmeter.
Figure 12:
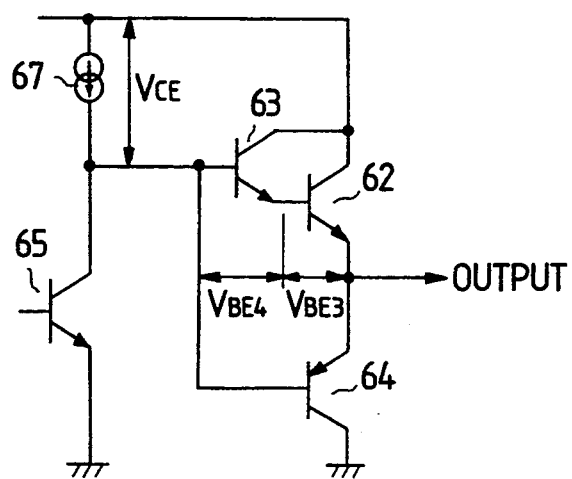

Further, the working and effect of the embodiment of this invention will be described hereinbelow by the comparison with an example. FIG. 10 shows an example to be compared with the embodiments of this invention, where the electric power for a heating thermo-sensitive resistor is obtained from a power supply, and the electric power for a non-heating temperature-compensating thermo-sensitive resistor is obtained from the power supply through a current-limiting resistor and an excessive-voltage protecting diode. In FIG. 10, the thermal type flowmeter for measuring the intake air quantity to an internal combustion engine of a motor vehicle is supplied power from a battery 400. An electric power is applied from the power supply through a power transistor 406 to a serial circuit comprising a heating thermo-sensitive resistor 402 and a resistor 404. The voltage across the thermo-sensitive resistor 402 is divided by a serial circuit comprising resistors 408 and 410. The voltage $V_M$ due to the resistor 404 is inputted through a resistor 412 to an inverting input terminal of an operational amplifier 414. Further, a constant voltage $V_R$ is applied through a resistor 416 to the inverting input terminal of the operational amplifier 414. Thus, the voltage drop across the resistor 412 is inputted as the offset voltage of the operational amplifier 414. The non-inverting input terminal of the operational amplifier 414 is coupled to a resistor 418, and a serial circuit comprising a non-heating thermo-sensitive resistor 420 and a resistor 422 is provided between the output terminal and non-inverting input terminal of the operational amplifier 414. To the inverting input terminal of an operational amplifier 424 there is inputted a voltage $V_A$ which is obtained by dividing the voltage across the thermo-sensitive resistor 402 using resistors 408 and 410. To the non-inverting input terminal of the operational amplifier 424 there is inputted the output of the operational amplifier 414. The output of the operational amplifier 424 is inputted to the power transistor 406. Further, a current-limiting resistor 426 is provided in series with the power supply, and further excessive-voltage protecting Zener diodes 428, 430 and 432 are provided in series thereto. These elements constitute a power supply circuit 434 which in turn supplies the electric power to the operational amplifiers 414 and 424.

According to the FIG. 10 circuit, the amount of energy supplied to the thermo-sensitive resistor 402 is feedback-controlled so that the temperature of the thermo-sensitive resistor 402 becomes higher by a predetermined value than the temperature of the thermo-sensitive resistor 420. The energization amount is therefore outputted as a signal corresponding to the flow rate. Further, according to the FIG. 10 circuit, the current to the thermo-sensitive resistor 420 entirely depends upon the operational amplifier 414. Hence, the current flowing from the power supply circuit 434 to the operational amplifier 414 must be increased. However, when this current increases, the voltage drop at the resistor 424 increases causing a problem where the minimum supply voltage necessary for the operation of the circuit to which the electric power is supplied through the resistor 426, increases. For increasing the current value and decreasing the voltage drop, the resistance value of the resistor 426 must be set to be low. However, when the resistance value of the resistor 426 is set to be low, the Zener diodes 428, 430 and 432 are required to have a large current capacity, thereby increasing the size of the power supply circuit 434. Moreover, in the FIG. 10 circuit, when reducing the affection of the internal offset voltages of the operational amplifiers 414 and 424, the current to the thermo-sensitive resistor 420 becomes large. Furthermore, the current passing through the power supply circuit 434 becomes large.

An arrangement for reducing the affection of the internal offset voltage will be described hereinbelow. In FIG. 10 circuit, the output voltage $V_M$ can be expressed by the following equation (22). Here, the resistance value of the thermo-sensitive resistor 402 is taken as $R_H$ and the resistance value of the thermo-sensitive resistor 420 is taken as $R_K$. Further, the resistance values of the resistors are expressed using the last two figures of the numerals of the same resistors. For example, the resistance value of the resistor 404 is expressed as R04. Moreover, the internal offset voltage of the operational amplifier 414 is taken as $V_{OS1}$ and the internal offset voltage of the operational amplifier 424 is taken as $V_{OS2}$. In addition, $R_H << R08+R10$.

$$V_M = \frac{R18 \times R10 \times V_{BR}}{(R_K + R22 + R18) \times (R08 \times R10) - R18 \times R08} -$$
$$\frac{(R_K + R22 + R18) \times (R08 \times R10) \times \Delta V}{(R_K + R22 + R18) \times (R08 \times R10) - R18 \times R08} +$$
$$\frac{(R_K + R22 + R18) \times (R08 \times R10) \times V_{OS1}}{(R_K + R22 + R18) \times (R08 \times R10) - R18 \times R08} +$$
$$\frac{R18 \times (R08 + R10) \times V_{OS2}}{(R_K + R22 + R18) \times (R08 \times R10) - R18 \times R08} \quad (22)$$

In the equation (22), the third term at the right side and the fourth term at the right side represent the affects of the internal offset voltage of the operational amplifier. Further, as seen from the equation (22), when changing the ratio R08/R10 of the resistance value R08 and the resistance value R10, the values of the third and fourth terms at the right side vary. That is, when reducing the ratio R08/R10, the values of the third and fourth terms at the right side becomes smaller, thereby reducing the affect of the internal offset voltage of the operational amplifier.

On the other hand, in the FIG. 10 circuit, the voltage $V_B$ can be expressed in accordance with the following equation (23), and the current I1 can be expressed by the following equation (24). As seen from this equation (24), as R08/R10 becomes smaller, the current I1 becomes larger.

$$V_B = (V_{BR} - V_M) \times \frac{R10}{R08 + R10} + V_M \quad (23)$$

$$I1 = \frac{(V_{BR} - V_M) \times \frac{R10}{R08 + R10} + V_M}{R_K + R22 + R18} \quad (24)$$

As a result, for obtaining a high-accurate operation of the thermal type flowmeter, it is preferable that the affect of the internal offset voltage of the operational amplifier is smaller. However, when making smaller R08/R10 to reduce the affect of the internal offset voltage thereof, there is a new problem that the current I1 flowing through the thermo-sensitive resistor 420 increases along with the current to be supplied to the operational amplifier 414.

Here, in the equation (22), the second term at the right side which relates to $\Delta V$ is indicative of the feedback amount in the bridge circuit. When changing the ratio R08/R10, the value of the second term at the right side varies, whereby both the feedback amount of the bridge circuit and responsibility varies. Thus, $\Delta V$ is set by adequately changing the resistance values of the resistors 412 and 416 so that the bridge circuit can stably be operated and the suitable responsibility can be obtained. That is, for obtaining a predetermined amount feedback, if R08/R10 is great, $\Delta V$ is set to be small, and if R08/R10 is small, $\Delta V$ is set to be great.

As described above, when the current to be supplied to the operational amplifier 414 is increased in order to reduce the effect of the internal offset voltage thereof, the voltage drop at the resistor 426 becomes large and the minimum supply voltage necessary for the measurement of the flow rate increases. Difficulty is therefore encountered in measuring the flow rate when the supply voltage is low. Further, if making small the resistance value of the resistor 426 to reduce the voltage drop at that resistor, Zener diodes 428, 430 and 432 must each have a large current capacity. This results in a problem that the size of the power supply circuit 434 is increased. Particularly, when attempting to construct circuits such as operational amplifiers with one-chip monolithic ICs for a low cost high-accuracy and high-quality circuit since the Zener diode having a large current capacity becomes large in area, the chip size is enlarged and the cost is increased. Moreover, in the FIG. 10 circuit, the internal offset voltage $V_{OS1}$ and $V_{OS2}$ of the two operational amplifiers are positive voltages and appear on the output voltage $V_M$. Hence, the output voltage $V_M$ varies in accordance with the internal offset voltages $V_{OS1}$ and $V_{OS2}$. Accordingly, the output voltage $V_M$ varies in accordance with the temperature drifts of both the internal offset voltages $V_{OS1}$ and $V_{OS2}$. As a result, the total offset voltage of the entire control circuit for feedback-controlling the temperature of the thermo-sensitive resistor varies under the influence of the internal offset voltages $V_{OS1}$ and $V_{OS2}$. This affects the responsibility of the feedback control circuit and others.

On the other hand, according to the above-described first embodiment, the current to be supplied to the thermo-sensitive resistor 8 is obtained from the emitter of the power transistor assembly 5. Therefore, the ration R10/R11 of the resistance values of the resistors 10 and 11 can be set so as to reduce the effects of the internal offset voltages of the operational amplifiers 200 and 300 without taking into account the increase in the voltage drop at the resistor 3 and increase in the capacities of the Zener diodes 101 to 103. In addition, according to the first embodiment, since the current for the thermo-sensitive resistor 8 is obtained from the emitter of the power transistor assembly 5, the resistance value of the resistor 3 can be set to be greater as compared with the FIG. 10 circuit. Accordingly, it is possible to make small the capacity of the Zener diode without lowering the minimum operating supply voltage of the apparatus. Particularly, when constituting the circuit with ICs, the element area of the Zener diode can be reduced so as to reduce the chip size, thereby providing a thermal type flowmeter at a low cost. Still further, according to the first embodiment, since the internal offset voltages $V_{OS1}$ and $V_{OS2}$ of the two operational amplifiers 200 and 300 have output voltage polarities equal but opposite to each other which cancel each other, it is possible to reduce the effects of the internal offset voltages $V_{OS1}$ and $V_{OS2}$ with respect to the output voltage. Particularly, in the embodiment, since the two operational amplifiers 200 and 300 are constructed on one IC chip, the internal offset voltages and the temperature drifts substantially become equal to each other. As a result of the canceling of the internal offset voltages, the total offset voltage can be set to be substantially equal to the offset voltage $\Delta V$ due to the basic voltage and the resistors 305 and 306.

Although in the above-described embodiments, the offset voltage $\Delta V$ is applied to one of the pair of transistors 308 and 309 provided within the operational amplifier 300, it is appropriate that this offset voltage is applied from the outside of the operational amplifier 300 to the inverting or non-inverting input terminal thereof. Further, it is also appropriate that the offset voltage is applied from the inside or outside of the operational amplifier 200 thereto.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A thermal type flowmeter for measuring a flow rate of a fluid in accordance with a heating quantity of a heating resistor, comprising:

a thermo-sensitive resistor provided within a fluid passage and arranged to heat when being energized;

an electric power adjusting element provided in series to said thermo-sensitive resistor so as to adjust an electric power to be supplied to said thermo-sensitive resistor in accordance with a current inputted to an input terminal of said electric power adjusting element;

a control circuit for outputting an adjustment signal to adjust an energization electric power to said thermo-sensitive resistor so that said thermo-sensitive resistor has a predetermined temperature;

a constant current source circuit connected to said input terminal of said electric power adjusting element to supply a predetermined constant current to said input terminal of said electric power adjusting element; and a current adjusting circuit connected to said input terminal of said electric power adjusting element and arranged to divide said constant current from said constant current source circuit in accordance with said adjustment signal from said control circuit so as to adjust the input current to said electric power adjusting element.

2. A flowmeter as claimed in claim 1, wherein said current adjusting circuit is equipped with a transistor circuit to divide said constant current form said constant current source circuit in accordance with said adjustment signal from said control circuit.

3. A flowmeter as claimed in claim 1, wherein said control circuit includes an operational amplifier.

4. A flowmeter as claimed in claim 3, wherein said operational amplifier inputs, through its one input terminal, a signal indicative of a temperature of said thermo-sensitive resistor so as to output said adjustment signal so that the temperature of said thermo-sensitive resistor becomes said predetermined temperature.

5. A flowmeter as claimed in claim 4, further comprising a second temperature-compensating thermo-sensitive resistor so that a signal indicative of a temperature of said second thermo-sensitive resistor is inputted to the other input terminal of said operational amplifier and so that said control circuit outputs said adjustment signal to cause the temperature of said first-mentioned thermo-sensitive resistor to be higher by a predetermined value than the temperature of said second thermo-sensitive resistor.

6. A flowmeter as claimed in claim 1, wherein said constant current source circuit is provided between a power supply and said input terminal of said electric power adjusting element.

7. A flowmeter as claimed in claim 1, further comprising a constant voltage circuit responsive to a supply voltage for outputting a predetermined constant voltage so that said control circuit operates in response to said constant voltage from said constant voltage circuit, said supply voltage being also applied to said constant current source circuit and said electric power adjusting element.

8. A flow meter as claimed in claim 7, further comprising a current-limiting circuit for limiting a current so that a power current-limited by said current-limiting circuit is applied to said constant voltage circuit and said constant current source circuit, said electric power adjusting element being arranged to be directly responsive to a power which is not current-limited by said current-limiting circuit.

9. A flowmeter as claimed in claim 8, further comprising an excessive-voltage protecting circuit for preventing the power current-limited by said current-limiting circuit from becoming an excessive voltage so that the power current-limited by said current-limiting circuit and protected by said excessive-voltage protecting circuit is applied to said constant voltage circuit and said constant current source circuit.

10. A flowmeter as claimed in claim 1, wherein said current adjusting circuit generates a predetermined voltage drop which is higher than a minimum operating voltage necessary for supply of an electric power by said electric power adjusting element.

11. A flowmeter as claimed in claim 10, wherein said current adjusting circuit comprises semiconductor elements so that said predetermined voltage drop is generated due to a voltage occurring at a junction point between a P-type semiconductor and a N-type semiconductor.

12. A flowmeter as claimed in claim 11, wherein said current adjusting circuit comprises a multi-step emitter-follower circuit including at least a second-step transistor whose emitter terminal is connected to said input terminal of said electric power adjusting element and a first-step transistor whose base terminal is coupled to said adjustment signal from said control circuit and whose emitter terminal is connected to said base terminal of said second-step transistor.

13. A flowmeter as claimed in claim 11, wherein said current adjusting circuit includes a plurality of diodes connected in a forward direction from said input terminal of said electric power adjusting element to an output terminal of said control circuit.

14. A flowmeter as claimed in claim 1, further comprising a second temperature-compensating thermo-sensitive resistor provided within said fluid passage and connected in parallel to said first-mentioned thermo-sensitive resistor so as to detect a temperature of said fluid and a temperature-compensating operational amplifier for adjusting a supply electric power to said second thermo-sensitive resistor.

15. A flowmeter as claimed in claim 14, further comprising a transistor provided in series to said second thermo-sensitive resistor so as to adjust a supply electric power to said second thermo-sensitive resistor in accordance with an output of said operational amplifier.

16. A flowmeter as claimed in claim 14, wherein an internal offset voltage of an operational amplifier for controlling a temperature of said first-mentioned thermo-sensitive resistor and an internal offset voltage of said operational amplifier for adjusting said supply electric power to said second thermo-sensitive resistor are developed with respect to a voltage indicative of said energization electric power to said first thermo-sensitive resistor to have opposite polarities.

17. A flowmeter as claimed in claim 16, further comprising:
a resistor connected in series to said first thermo-sensitive resistor to generate a first voltage signal corresponding to said energization electric power to said first thermo-sensitive resistor;
a voltage-dividing resistor circuit provided in parallel to said first thermo-sensitive resistor to generate a second voltage signal corresponding to a voltage applied to said first thermo-sensitive resistor; and
a resistor provided in series to said second thermo-sensitive resistor to generate a third voltage signal corresponding to an energization electric power to said second thermo-sensitive resistor,
wherein said first voltage signal is inputted to an non-inverting input terminal of said operational amplifier for controlling said temperature of said first thermo-sensitive resistor, said third voltage signal is inputted to an inverting input terminal of said operational amplifier for controlling said temperature of said first thermo-sensitive resistor, said second voltage signal is inputted to a non-inverting input terminal of said operational amplifier for adjusting said energization electric power to said second thermo-sensitive resistor, and a terminal voltage of said second thermo-sensitive resistor is inputted to an inverting input terminal of said operational amplifier for adjusting said energization electric power to said second thermo-sensitive resistor.

18. A thermal type flowmeter for measuring a flow rate of a fluid in accordance with a heating quantity of a heating resistor, comprising:
a constant voltage power circuit for inputting a supply voltage from a power source to output a predetermined constant voltage;
a thermo-sensitive resistor provided within a fluid passage and arranged to heat when being energized;
an electric power adjusting element provided in series to said thermo-sensitive resistor so as to adjust an electric power to be supplied from said power source to said thermo-sensitive resistor in accordance with an input current to an input terminal of said electric power adjusting element;
a control circuit operable in response to said constant voltage from said constant voltage power circuit so as to generate an adjustment signal to adjust an energization electric power to said thermo-sensitive resistor so that said thermo-sensitive resistor has a predetermined temperature;
a constant current source circuit operable in response to said supply voltage from said power source and connected to said input terminal of said electric power adjusting element to supply a predetermined constant current to said electric power adjusting element; and
a current adjusting circuit connected to said input terminal of said electric power adjusting element and arranged to divide said constant current from said constant current source circuit in accordance with said adjustment signal from said control circuit so as to adjust a current to be inputted to said electric power adjusting element.

19. A thermal type flowmeter for measuring a flow rate of a fluid in accordance with a heating quantity of a heating resistor, comprising:

a constant voltage circuit (120) for inputting a supply voltage from a power source to output a predetermined constant voltage;

a thermo-sensitive resistor (7) provided within a fluid passage and arranged to heat when being energized;

an electric power adjusting element (5) constructed with a plurality of transistors darlington-coupled to each other and provided in series to said thermo-sensitive resistor and arranged to adjust an electric power to be supplied from said power source to said thermo-sensitive resistor in accordance with an input current to an input terminal of said electric power adjusting element;

a control circuit (360) operable in response to said constant voltage from said constant voltage circuit and arranged to output an adjustment signal to adjust an energization electric power to said thermo-sensitive resistor so that said thermo-sensitive resistor has a predetermined temperature;

a constant current source circuit (331) responsive to said supply voltage from said power source to generate predetermined constant currents; and a multi-step emitter-follower circuit comprising a plurality of transistors whose number is greater than the number of said darlington-coupled transistors constituting said electric power adjusting element, said emitter-follower circuit including:

a first-step transistor (322) for inputting, through its base terminal, said adjustment signal from said control circuit, said emitter terminal of said first-step transistor being connected to a base terminal of a next-step transistor;

intermediate-step transistors (323, 324, 325), a base terminal of each of said intermediate-step transistors being connected to said emitter terminal of a previous-step transistor and said emitter terminal of each of said intermediate-step transistors being connected to said base terminal of a next-step transistor; and a final-step transistor (326) for inputting, through its emitter terminal, said constant current from said constant current source circuit, said emitter terminal of said final-step transistor being connected to said input terminal of said electric power adjusting element and a base terminal of said final-step transistor being connected to an emitter terminal of a transistor previous to said final-step transistor.

* * * * *